(12) United States Patent
Ma

(10) Patent No.: US 10,475,109 B2
(45) Date of Patent: Nov. 12, 2019

(54) INFORMATION PROCESSING DEVICE, INFORMATION PROCESSING METHOD, AND INFORMATION PROCESSING PROGRAM

(71) Applicant: Rakuten, Inc., Tokyo (JP)

(72) Inventor: Chenhui Ma, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 147 days.

(21) Appl. No.: 15/543,267

(22) PCT Filed: Aug. 24, 2015

(86) PCT No.: PCT/JP2015/073750
§ 371 (c)(1),
(2) Date: Jul. 13, 2017

(87) PCT Pub. No.: WO2017/033264
PCT Pub. Date: Mar. 2, 2017

(65) Prior Publication Data
US 2018/0012287 A1     Jan. 11, 2018

(51) Int. Cl.
*G06Q 30/00* (2012.01)
*G06Q 30/06* (2012.01)
*G06Q 50/28* (2012.01)
*G06Q 10/08* (2012.01)

(52) U.S. Cl.
CPC ....... *G06Q 30/0635* (2013.01); *G06Q 10/083* (2013.01); *G06Q 50/28* (2013.01)

(58) Field of Classification Search
CPC ................................. G06Q 30/06–08
USPC ................................. 705/26.1–27.2
See application file for complete search history.

(56) References Cited

U.S. PATENT DOCUMENTS

2016/0328781 A1* 11/2016 Patel-Zellinger ............
G06Q 30/0635

FOREIGN PATENT DOCUMENTS

JP     2013-58131 A     3/2013

* cited by examiner

*Primary Examiner* — Ethan D Civan
(74) *Attorney, Agent, or Firm* — Sughrue Mion, PLLC

(57) ABSTRACT

It is an object to allow, even if an item selected by a user cannot be shipped to its destination, the user to order another item without wasting the effort spent in selecting the item. An information processing device receives selection of an item for order. The information processing device obtains a destination specified for the selected item. If the specified destination is outside the area to which the selected item can be shipped, the information processing device causes substitute information to be displayed. The substitute information can identify a substitute item that can be shipped to the destination.

10 Claims, 30 Drawing Sheets

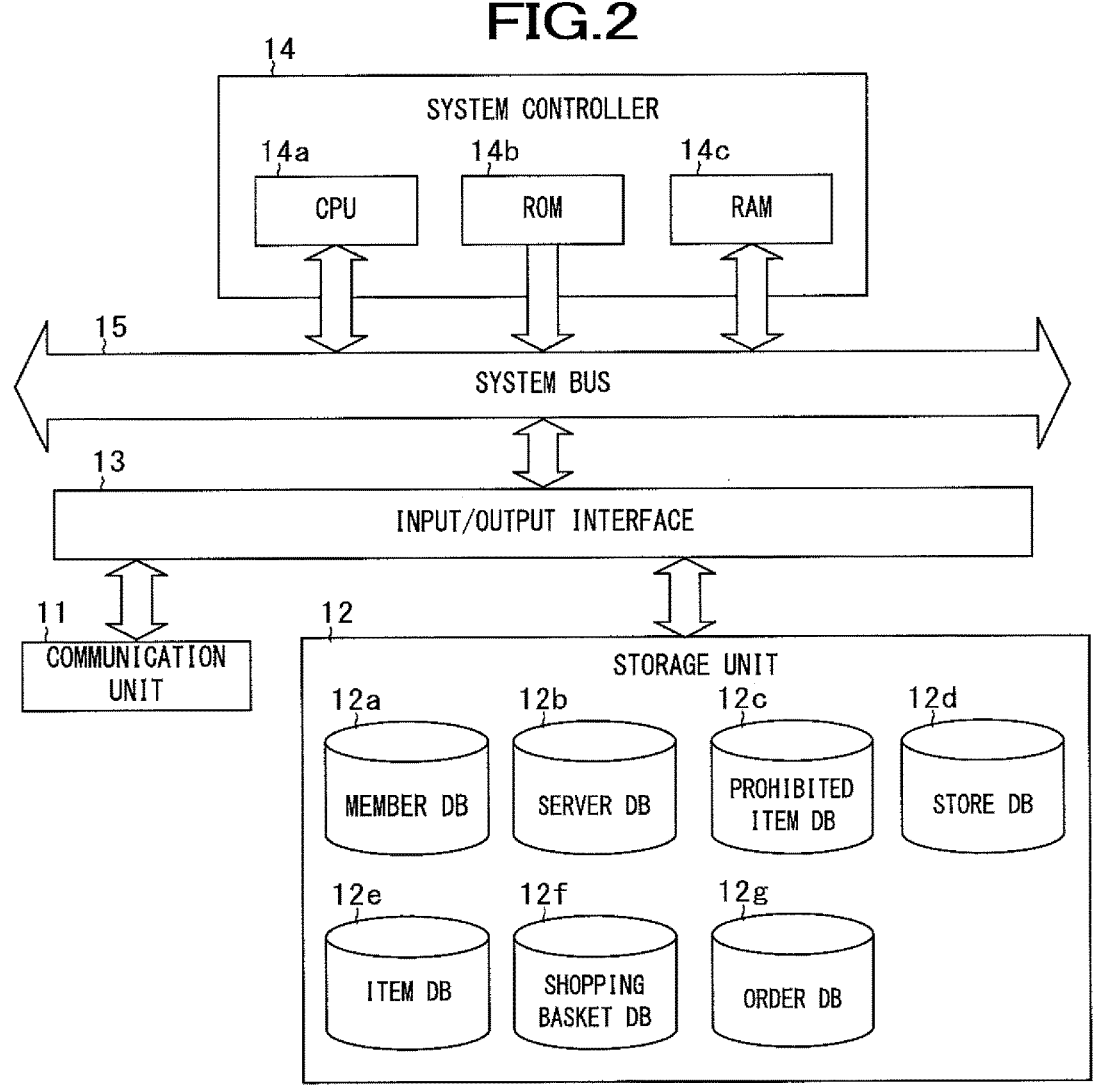

FIG.3

MEMBER DB 12a
| USER ID |
| PASSWORD |
| NICKNAME |
| NAME |
| BIRTH DATE |
| GENDER |
| ZIP CODE |
| ADDRESS |
| TELEPHONE NUMBER |
| EMAIL ADDRESS |
| CREDIT CARD INFORMATION |
| ... |

SERVER DB 12b
| IP ADDRESS |
| COUNTRY NUMBER |
| ... |

PROHIBITED ITEM DB 12c
| CATEGORY ID |
| IMPORT PROHIBITED COUNTRY LIST |
| EXPORT PROHIBITED COUNTRY LIST |
| ... |

STORE DB 12d
| STORE ID |
| PASSWORD |
| STORE NAME |
| ZIP CODE |
| ADDRESS |
| TELEPHONE NUMBER |
| FAX NUMBER |
| EMAIL ADDRESS |
| IP ADDRESS |
| DELIVERY AREA INFORMATION |
| ... |

ITEM DB 12e
| STORE ID |
| ITEM ID |
| PRODUCT CODE |
| CATEGORY ID |
| TRADE NAME |
| PRICE |
| ... |

SHOPPING BASKET DB 12f
| SHOPPING BASKET ID |
| USER ID |
| STORE ID |
| ITEM ID |
| QUANTITY |
| SUBSTITUTE FLAG |
| PRE-CHANGE ITEM INFORMATION |
| ... |

ORDER DB 12g
| ORDER NUMBER |
| ORDER DATE AND TIME |
| USER ID |
| STORE ID |
| ITEM ID |
| QUANTITY |
| SUBSTITUTE FLAG |
| PRE-CHANGE ITEM INFORMATION |
| TOTAL AMOUNT |
| SHIPPING FEE |
| DESTINATION INFORMATION |
| ... |

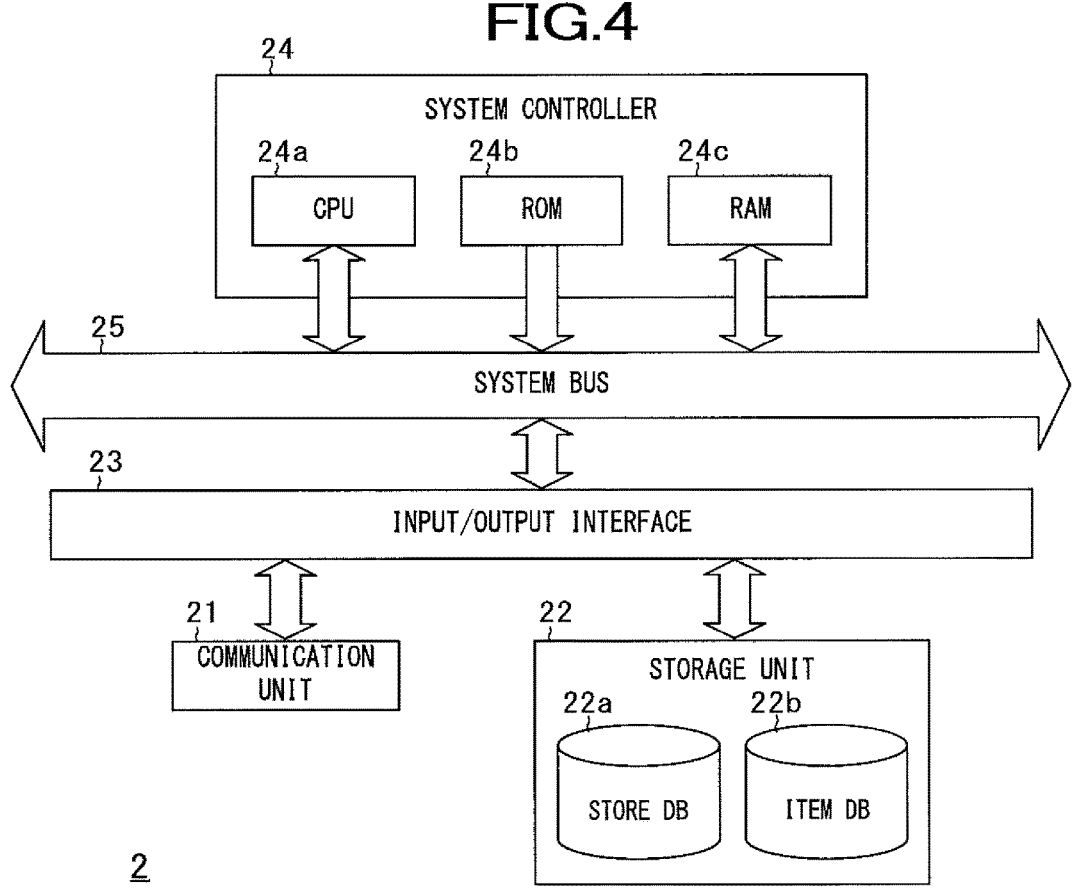

FIG.6A

ITEM A

ITEM ID 11111111
PRICE XXXX

..................................................
..............................................

QUANTITY [1] [ADD TO SHOPPING BASKET] ～110

SHOPPING BASKET

210 →

| STORE NAME X | | | | |
|---|---|---|---|---|
| PURCHASE | ITEM(S) IN SHOPPING BASKET | UNIT PRICE | ORDER QUANTITY | DELETE |
| ☑ | ITEM A | XXXX YEN | [1] | DELETE ～211 |
| | PROCEED TO CHECKOUT ～212 | | | |

210 →

| STORE NAME Y | | | | |
|---|---|---|---|---|
| PURCHASE | ITEM(S) IN SHOPPING BASKET | UNIT PRICE | ORDER QUANTITY | DELETE |
| ☑ | ITEM B1 | XXXX YEN | [1] | DELETE ～211 |
| ☑ | ITEM B2 | XXXX YEN | [1] | DELETE ～211 |
| | PROCEED TO CHECKOUT ～212 | | | |

FIG.7

TOTAL PRICE XXXX YEN + SHIPPING FEE XXX YEN = ORDER TOTAL XXXX YEN

310

| ITEM | UNIT PRICE | ORDER QUANTITY | SUBTOTAL |
|---|---|---|---|
| ITEM A | XXXX YEN | 1 | XXXX YEN |

320

PAYMENT METHOD

CREDIT CARD — CHANGE

330

SHIPPING METHOD

COURIER SERVICE — CHANGE

340

ORDERER INFORMATION

NAME : XXX XXX
ZIP CODE XXX-XXXX
ADDRESS : XXXXXXXXXXXXXXXXXXXXXXXX, TOKYO
TELEPHONE NUMBER : XXX-XXXX-XXXX — CHANGE

350

DESTINATION

SAME AS ORDERER — CHANGE — 351

PLACE YOUR ORDER — 360

FIG.8

| NAME | | |
|---|---|---|
| | [            ] | ~ 410 |
| ZIP CODE | [  ] – [    ] | ~ 420 |
| PREFECTURE | SELECT ▼ | ~ 430 |
| | IF YOU NEED INTERNATIONAL SHIPPING, SELECT "FOREIGN COUNTRY" | |
| CITY (COUNTRY NAME) | [          ] | ~ 440 |
| REMAINING ADDRESS | [              ] | ~ 450 |
| TELEPHONE NUMBER | [   ] – [   ] – [    ] | ~ 460 |
| | CHANGE | ~ 470 |

FIG.9

| ITEM | UNIT PRICE | ORDER QUANTITY | SUBTOTAL |
|---|---|---|---|
| ITEM A | XXXX YEN | 1 | XXXX YEN |

TOTAL PRICE XXXX YEN + SHIPPING FEE XXX YEN = ORDER TOTAL XXXX YEN

310

320 — PAYMENT METHOD
CREDIT CARD [CHANGE]

330 — SHIPPING METHOD
COURIER SERVICE [CHANGE]

350 — ORDERER INFORMATION
NAME : XXX XXX
ZIP CODE : XXX-XXXX
ADDRESS : xxxxxxxxxxxxxxxxxxxxxxxxx, TOKYO
TELEPHONE NUMBER : XXX-XXXX-XXXX
[CHANGE]

350 — DESTINATION
NAME : XXX XXX
ZIP CODE : XXX-XXXX
ADDRESS : xxxxxxxxxxxxxxxxxxxxxxxxx, U.S.A.
TELEPHONE NUMBER : XXX-XXXX-XXXX
[CHANGE] — 351

[PLACE YOUR ORDER] — 360

FIG.11

| SHOPPING BASKET | | | | |
|---|---|---|---|---|
| STORE NAME Z1 | | | | |
| PURCHASE | ITEM(S) IN SHOPPING BASKET | UNIT PRICE | ORDER QUANTITY | DELETE |
| ☑ | ITEM C1 | XXXX YEN | 1 | DELETE |
| | PROCEED TO CHECKOUT | | | |

| STORE NAME Y | | | | |
|---|---|---|---|---|
| PURCHASE | ITEM(S) IN SHOPPING BASKET | UNIT PRICE | ORDER QUANTITY | DELETE |
| ☑ | ITEM B1 | XXXX YEN | 1 | DELETE |
| ☑ | ITEM B2 | XXXX YEN | 1 | DELETE |
| | PROCEED TO CHECKOUT | | | |

FIG.16

| MEMBER DB 12a |
|---|
| USER ID |
| PASSWORD |
| NICKNAME |
| NAME |
| BIRTH DATE |
| GENDER |
| ZIP CODE |
| ADDRESS |
| TELEPHONE NUMBER |
| EMAIL ADDRESS |
| CREDIT CARD INFORMATION |
| NUMBER OF IMPRESSIONS |
| DESTINATION AREA INFORMATION |
| . . . |

FIG.23

```
TO WHOM IT MAY CONCERN IN STORE X:

IF INTERNATIONAL SHIPPING BECOMES AVAILABLE, YOUR SALES ARE EXPECTED TO INCREASE.
WE RECOMMEND MAKING INTERNATIONAL SHIPPING AVAILABLE.

PLEASE SEE BELOW FOR A DESCRIPTION OF HOW TO SET UP INTERNATIONAL SHIPPING.
https://www.xxxxx.com/xxxxxxxxxxxxxxxxxxxxxxxxxxxxxxxxx
```

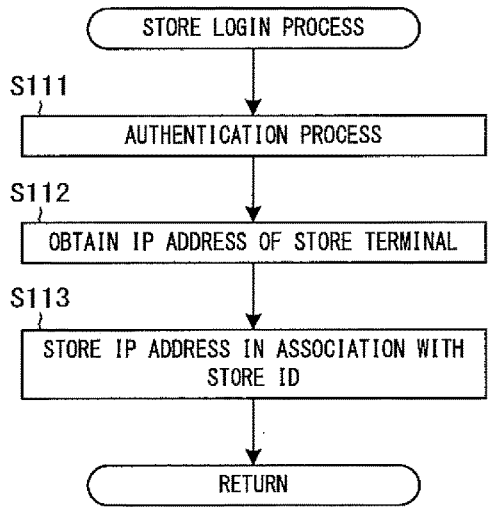
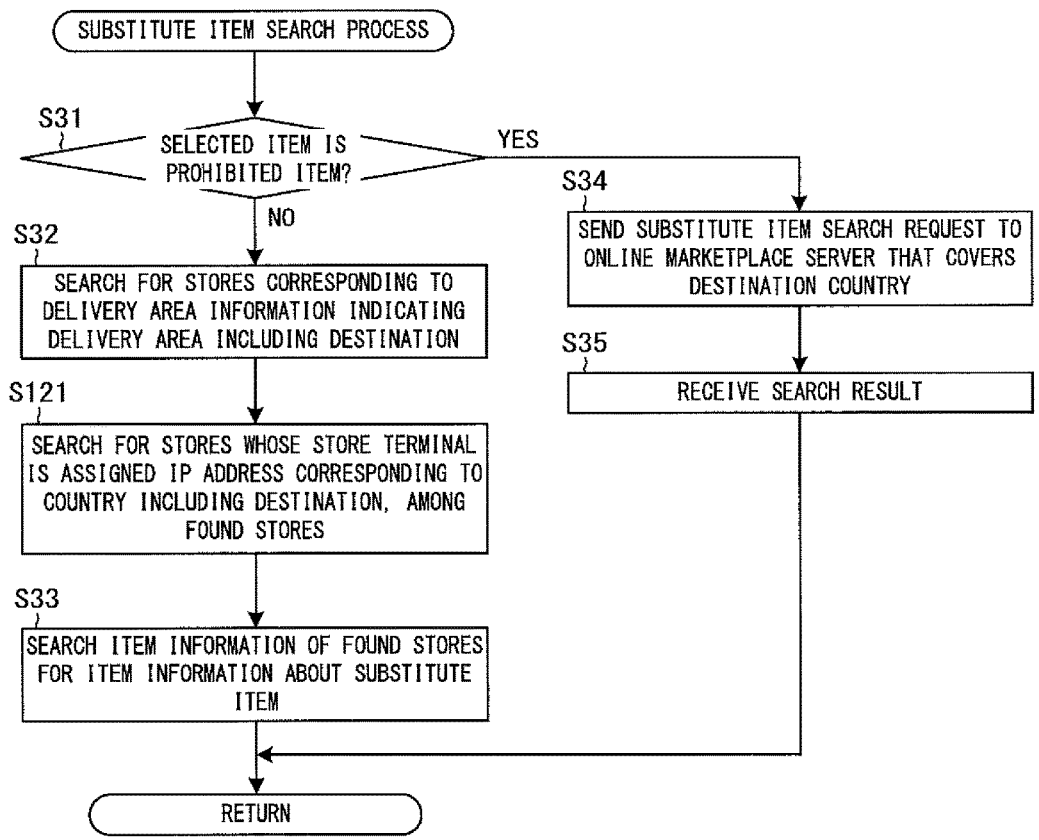

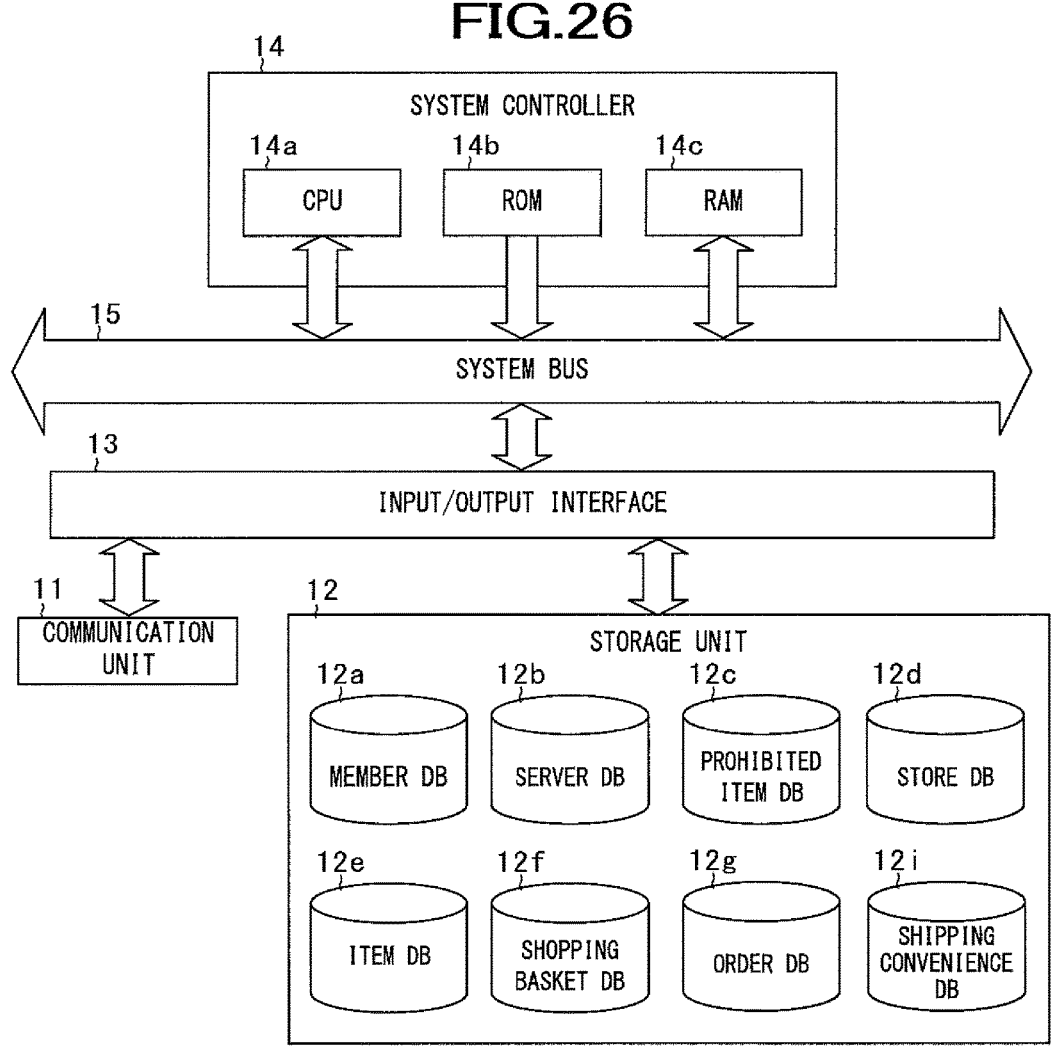

FIG.27A

| SHIPPING CONVENIENCE DB | 12i |
|---|---|
| DESTINATION COUNTRY NUMBER ||
| CONVENIENCE VALUE | SHIP-FROM COUNTRY NUMBER |
| CONVENIENCE VALUE | SHIP-FROM COUNTRY NUMBER |
| CONVENIENCE VALUE | SHIP-FROM COUNTRY NUMBER |
| . . . ||

FIG.27B

SHIPPING TO UNITED KINGDOM

| CONVENIENCE | RANK | COUNTRY NAME |
|---|---|---|
| HIGH | 1 | UNITED KINGDOM |
|  | 2 | FRANCE |
|  | 3 | GERMANY |
|  | 4 | AUSTRIA |
|  | 5 | UNITED STATES |
|  | 6 | CHINA |
| LOW | 7 | JAPAN |

FIG.27C

SHIPPING TO CHINA

| CONVENIENCE | RANK | COUNTRY NAME |
|---|---|---|
| HIGH | 1 | CHINA |
|  | 2 | JAPAN |
|  | 3 | AUSTRIA |
|  | 4 | GERMANY |
|  | 5 | FRANCE |
|  | 6 | UNITED KINGDOM |
| LOW | 7 | UNITED STATES |

INFORMATION PROCESSING DEVICE, INFORMATION PROCESSING METHOD, AND INFORMATION PROCESSING PROGRAM

CROSS REFERENCE TO RELATED APPLICATIONS

This application is a National Stage of International Application No. PCT/JP2015/073750 filed Aug. 24, 2015, the contents of all of which are incorporated herein by reference in their entirety.

TECHNICAL FIELD

The present invention relates to techniques for an information processing device that receives selection of an item for order and allows specification of where to ship the item.

BACKGROUND ART

For example, Patent Literature 1 discloses that a user selects an item and adds the item to his or her shopping cart in order to request proxy for private imports on a foreign mail-order website and then enters a shipping address for the item (Paragraph [0109]).

CITATION LIST

Patent Literature

Patent Literature 1: JP 2013-058131 A

SUMMARY OF INVENTION

Technical Problem

However, there is a case where, for example, a foreign seller limits its delivery area to the country in which the seller is located. In that case, even when the user enters an address in Japan, the selected item cannot be shipped to Japan from overseas. Also for example, if the selected item is a prohibited item that cannot be imported to Japan, the item cannot be shipped to Japan. Thus, the effort that the user has made to select the item goes to waste. In view of the above, it is an object of the present invention to provide, for example, an information processing device and an information processing method that allow, even if an item selected by a user cannot be shipped to its destination, the user to order another item without wasting the effort spent in selecting the item.

Solution to Problem

To solve the above problem, some embodiments include receiving means, obtaining means, and display control means. The receiving means receives selection of an item for order, among a plurality of items. The obtaining means obtains a destination specified for the item selected. If the specified destination is outside an area to which the selected item can be shipped, the display control means causes substitute information to be displayed. The substitute information can identify a substitute item that can be shipped to the destination.

According to this invention, if a destination specified for a selected item is outside the area to which the selected item can be shipped, substitute information is displayed. The substitute information can identify a substitute item that can be shipped to the destination. Based on a user's operation about the displayed substitute information, the user can order an item that can be shipped to the specified destination. Thus, even if the selected item cannot be shipped to the destination, it is possible to prevent user's effort of selecting the item from going to waste.

In some embodiments the receiving means identifies the selected item, from a shopping container used to add items to during online shopping that allows the plurality of items to be ordered, and the display control means causes the substitute information to be displayed so that the substitute item can be selected. The information processing device further includes replacing means. When the substitute item is selected, the replacing means replaces the selected item in the container with the substitute item.

According to this invention, substitute information is displayed so that a substitute item can be selected. A selected item is initially stored in a shopping container. When a user selects the substitute item, the initially selected item in the container is replaced with the substitute item. This allows the user to change an item to order from an item that cannot be shipped to the destination to another item that can be shipped to the destination, with a simple operation.

Some embodiments include element display control means, destination area obtaining means, and providing means. When the substitute information has been displayed for a user a predetermined number of times or more, the element display control means causes an operation element for specifying a destination area to be displayed on a predetermined screen for allowing selection of items, among online shopping screens that allow the plurality of items to be ordered. The destination area obtaining means obtains a destination area specified based on an operation on the displayed operation element. The providing means provides the user with information about at least one item that can be shipped to the specified destination area, among the plurality of items.

According to this invention, when a user has specified a destination outside the area to which a selected item can be shipped a predetermined number of times or more before, an operation element for specifying a destination area is displayed on a predetermined screen for allowing selection of items. Based on an operation on the operation element, the user can specify a destination area. When a destination area is specified, information about items that can be shipped to the specified area, among a plurality of items, is provided to the user. The user can select an item that can be shipped to the specified area to order the item, based on the displayed information. By specifying a destination located in the specified area, the user can order an item that can be shipped to the destination. This can prevent the user from selecting an item that cannot be shipped to the specified area.

Some embodiments include determining means. When the substitute item is ordered and an order total for the substitute item is paid, the determining means determines to give a coupon that can be used to purchase items being sold by seller of the selected item to an orderer of the substitute item.

According to this invention, when a user orders a substitute item about which substitute information is displayed and then payment of the order total for the substitute item is completed, the user can get a coupon that can be used to purchase items from a seller that sells an initially selected item. A user who selected an item of a store to order the item is likely to order an item at the store after that. Giving the user who has ordered the substitute item a coupon that can be used to purchase items from the seller that sells the replaced item can give the store, which sells the replaced item, a chance to sell items.

Some embodiments include area information retrieval means. Storage means stores, for each of a plurality of sellers that sell the plurality of items, area information that can identify which area the seller offers shipping to. The area information retrieval means retrieves area information of a seller that sells the selected item from the storage means. If the specified destination is outside an area identified by the retrieved area information, the display control means causes the substitute information to be displayed. The information processing device further includes output means. When the proportion of actual sales of substitutes for items of a target seller, among the plurality of sellers, to the target seller's actual sales is greater than or equal to a predetermined percentage, the output means outputs recommendation information recommending to the target seller that the target seller offer shipping outside an area indicated by the area information of the target seller.

According to this invention, if a seller that sells a selected item does not offer shipping to a specified destination, substitute information is displayed. When the proportion of the actual sales of substitutes for items of a target seller to the target seller's actual sales is greater than or equal to a predetermined percentage, recommendation information is output. The recommendation information recommends to the target seller that the target seller offer shipping outside the area to which the target seller offers shipping. If the target seller offers shipping to an area to which it has not offered shipping, the target seller has a potential to increase its actual sales by more than a predetermined percentage of its current actual sales. Thus, the recommendation information viewed by the target seller can prompt the target seller to offer item shipping to an area to which it has not offered shipping.

Some embodiments include address obtaining means. The address obtaining means obtains the network address of a terminal device from a packet sent from the terminal device to the information processing device over a network. The terminal device is one of a plurality of terminal devices used by a plurality of sellers that sell the plurality of items. An area in which a terminal device used by a seller is located is identified based on the network address of the terminal device. The display control means causes the substitute information to be displayed. The substitute information can identify an item being sold by a seller that uses a terminal device located in an area including the specified destination, among the plurality of sellers.

According to this invention, substitute information that can identify an item being sold by a seller, among a plurality of sellers, is displayed. An area identified based on the network address of a terminal device used by the seller includes a specified destination. It is likely that the area in which the terminal device used by the seller is located is a ship-from place of the seller. Thus, a substitute item is likely to be shipped from the ship-from place in the area to its destination in the area. This can make it more convenient to ship the substitute item.

In some embodiments the information processing device is included in at least one of a plurality of server devices capable of connecting to each other via a network. The plurality of server devices correspond one-to-one to online shopping sites of a plurality of areas. Each of the plurality of server devices includes a database on items that can be shipped to at least an area covered by the server device among the plurality of areas, and search means for searching the database for items. The information processing device further includes search control means. The search control means causes the plurality of server devices to search for the substitute item one after another, in an order based on shipping convenience from each of the plurality of areas to the specified destination. The display control means causes the substitute information to be displayed, based on the result of a search by a server device that has found the substitute item first among the plurality of server devices.

According to this invention, there are a plurality of server devices that correspond one-to-one to online shopping sites of a plurality of areas. Each of the server devices searches a database on items that can be shipped to an area covered by at least the server device among the plurality of areas for items. In an order based on convenience when substitute items are shipped from each of the plurality of areas to a specified destination, the plurality of server devices search for substitute items one after another. Based on the result of a search by a server device that has found a substitute item first among the plurality of server devices, substitute information is displayed. Thus, an item that can be shipped to an area with higher shipping convenience to its destination is preferentially determined to be a substitute item. Consequently, a substitute item is likely to be shipped from an area with higher shipping convenience to its destination. This can make it more convenient to ship the substitute item. In addition, a convenient item can be found faster.

Some embodiments include an information processing method performed by a computer. The method includes the following steps. Selection of an item for order, among a plurality of items, is received. A destination specified for the item selected is obtained. If the specified destination is outside an area to which the selected item can be shipped, substitute information is displayed. The substitute information can identify a substitute item that can be shipped to the destination.

Some embodiments cause a computer to function as receiving means, obtaining means, and display control means. The receiving means receives selection of an item for order, among a plurality of items. The obtaining means obtains a destination specified for the item selected. If the specified destination is outside an area to which the selected item can be shipped, the display control means causes substitute information to be displayed. The substitute information can identify a substitute item that can be shipped to the destination.

Advantageous Effects of Invention

According to the present invention, if a destination specified for a selected item is outside the area to which the selected item can be shipped, substitute information is displayed. The substitute information can identify a substitute item that can be shipped to the destination. Based on a user's operation about the displayed substitute information, the user can order an item that can be shipped to the specified destination. Thus, even if the selected item cannot be shipped to the destination, the user can prevent his or her effort of selecting the item from going to waste.

BRIEF DESCRIPTION OF DRAWINGS

FIG. 2 is a block diagram schematically showing an example configuration of a domestic online marketplace server 1 according to an embodiment.

FIG. 3 is a diagram showing example database entries.

FIG. 4 is a block diagram schematically showing an example configuration of a foreign online marketplace server 2 according to an embodiment.

FIG. 6A is a diagram showing an example item page.

FIG. 6B is a diagram showing an example shopping basket page.

FIG. 7 is a diagram showing an example order details review page.

FIG. 8 is a diagram showing an example destination change window.

FIG. 9 is a diagram showing an example order details review page after a destination is changed.

FIG. 11 is a diagram showing an example shopping basket page.

FIG. 16 is a diagram showing example entries in a member DB 12a.

FIG. 23 is a diagram showing an example of the body of an international shipping recommendation mail.

FIG. 25A is a flowchart showing an example of a store login process in the system controller 14 of the domestic online marketplace server 1 according to an embodiment.

FIG. 25B is a flowchart showing an example of the substitute item search process in the system controller 14 of the domestic online marketplace server 1 according to an embodiment.

FIG. 26 is a block diagram schematically showing an example configuration of the domestic online marketplace server 1 according to an embodiment.

FIG. 27A is a diagram showing an example of information stored in a shipping convenience DB 12i.

FIG. 27B is a diagram showing an example shipping convenience ranking of a plurality of countries.

FIG. 27C is a diagram showing an example shipping convenience ranking of a plurality of countries.

DESCRIPTION OF EMBODIMENTS

The following describes embodiments of the present invention in detail with reference to the drawings. The embodiments described below are embodiments in which the present invention is applied to an information processing system.

Figure 1:
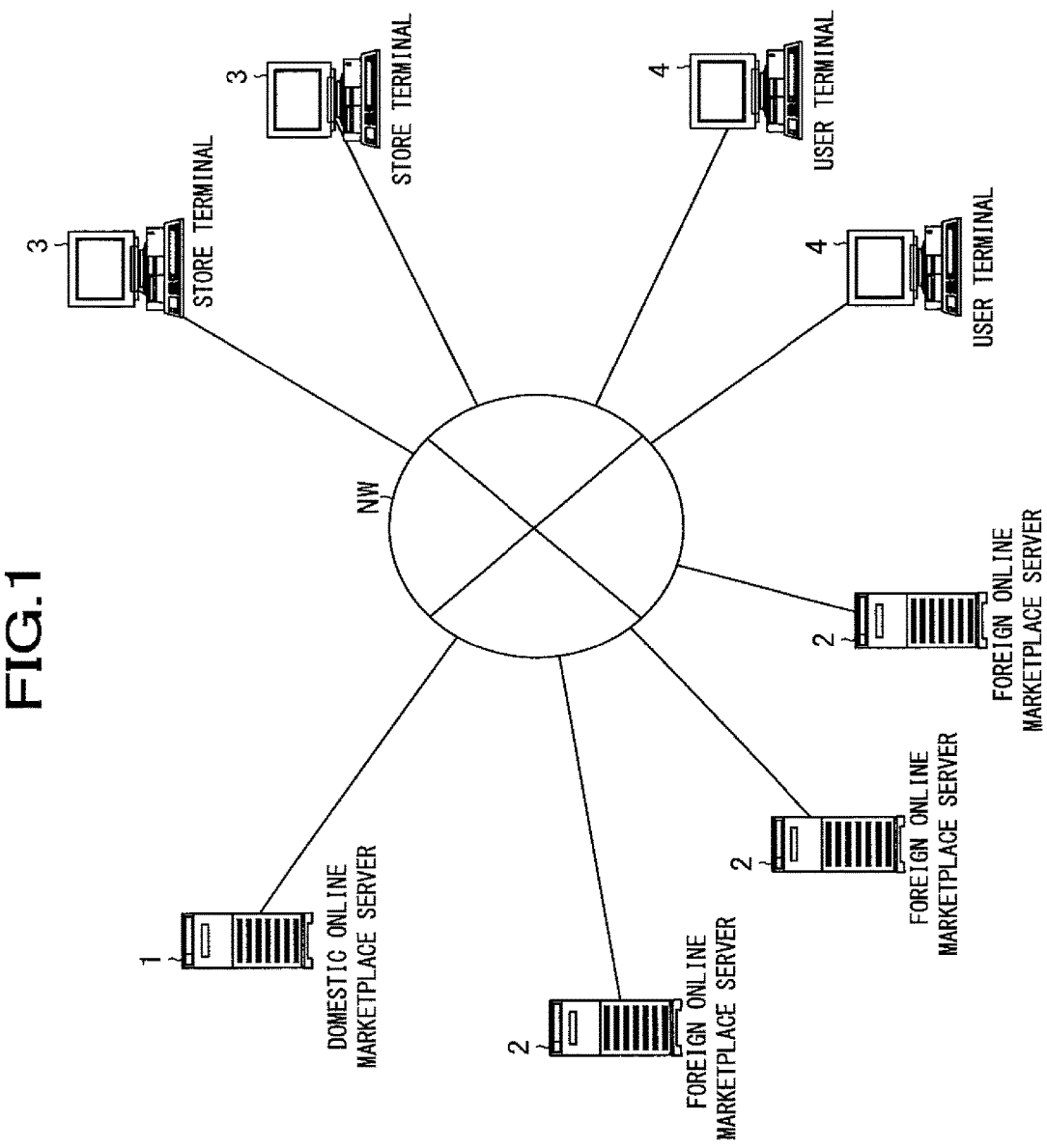
FIG. 1 is a diagram schematically showing an example configuration of an information processing system S according to an embodiment.

1. First Embodiment 1-1. Configuration and Functional Overview of Information Processing System First, a configuration and a functional overview of an information processing system S according to this embodiment are described with reference to FIG. 1. FIG. 1 is a diagram schematically showing an example configuration of the information processing system S according to this embodiment.

As shown in FIG. 1, the information processing system S includes a domestic online marketplace server 1, one or more foreign online marketplace servers 2, a plurality of store terminals 3, and a plurality of user terminals 4. The domestic online marketplace server 1 is capable of exchanging data with each foreign online marketplace server 2, each store terminal 3, and each user terminal 4 over a network NW using communication protocols, such as TCP/IP. The network NW includes, for example, the Internet, a dedicated communication line (e.g., community antenna television (CATV) line), a mobile communication network (including base stations), and a gateway.

The domestic online marketplace server 1 and the foreign online marketplace servers 2 are each a server device that performs various processes for an online marketplace in which items can be purchased. The domestic online marketplace server 1 and the foreign online marketplace server 2 are collectively referred to as "online marketplace servers". In each online marketplace, various stores sells various items. The online marketplace is an example of an online shopping site. The online shopping site is not limited to an online marketplace. The online shopping site may be, for example, a website on which only a single seller sells items.

Each online marketplace server corresponds to, for example, an online marketplace for a predetermined country. An online marketplace for a certain country may be, for example, an online marketplace for selling items that can be shipped to the country. That is, a store in an online marketplace for a certain country can ship items to the country. The online marketplace servers may cover mutually different countries. At least one online marketplace server may cover a plurality of countries. In this case, each store can ship items to at least one of the plurality of countries. Each online marketplace server may be placed in any country that the online marketplace server covers or in any of the other countries. Each country is an example of an area of the present invention. The area is not limited to a country. The area may be, for example, a region, a state, a prefecture, a city, a ward, a town, a village, a continent, or an island.

Each online marketplace server may be configured to allow for each store in an online marketplace of a country that the online marketplace server covers to set whether items can be shipped abroad from the country. A store that can ship items also abroad is referred to as a "store that offers international shipping". For example, each online marketplace server may be configured to allow each store to set that items can be shipped to any country in which predetermined international mail is available. Also for example, each online marketplace server may be configured to allow each store to set one or more countries to which items can be shipped.

The domestic online marketplace server 1 is an example of an information processing device according to the present invention. A country that the domestic online marketplace server 1 covers is referred to as a "first country". The first country may be any one country. For example, the first country may be Japanese or another country. An online marketplace of the first country is referred to as a "domestic online marketplace". For example, the domestic online marketplace server 1 sends web pages of the corresponding online marketplace and performs processes for item searches and orders, in response to requests from the store terminals 3 and the user terminals 4.

The domestic online marketplace server 1 may determine from which stores to provide item information to a user terminal 4 that has connected to the domestic online marketplace server 1, for example, based on the IP address assigned to the user terminal 4. The domestic online marketplace server 1 can estimate which country the user terminal 4 and the user of the user terminal 4 are currently located in, from the IP address of the user terminal 4. When the user is located in the first country, the domestic online marketplace server 1 may allow the user to be provided with information about items of all stores in the online marketplace of the first country. When the user is located in a country except the first country, the domestic online marketplace server 1 may allow the user to be provided with information of items of only stores that can ship the items abroad from the first country, among the stores in the online marketplace of the first country. It is probable that an item to be ordered by the user will be shipped to a country in which the user is located. The domestic online marketplace server 1 prevents information about items of stores that cannot ship any item to the country to which the item may be shipped from being provided, in the manner described above.

Each foreign online marketplace server 2 corresponds to an online marketplace for a foreign country outside the first country. An online marketplace for a foreign country is referred to as a "foreign online marketplace". For example, a foreign online marketplace server 2 may correspond to an American online marketplace, another foreign online marketplace server 2 may correspond to a Chinese online marketplace, and still another foreign online marketplace server 2 may correspond to a UK online marketplace. For example, each foreign online marketplace server 2 sends web pages of the corresponding online marketplaces and performs processes for item searches and orders, in response to requests from the user terminals 4. The foreign online marketplace servers 2 are not essential elements for the information processing system S. The present invention can be applied to cases where there is no foreign online marketplace server 2.

Each store terminal 3 is a terminal device used by, for example, an employee of a store in the domestic online marketplace. Stores in the domestic online marketplace may be located in the first country or in another country. The store terminal 3 accesses a server device, such as the domestic online marketplace server 1, in accordance with an operation performed by, for example, the employee. Thus, the store terminal 3 receives a web page from the server device and displays the web page. The store terminal 3 has software, such as a browser and an email client, installed on it. For example, the employee enters information about items for sale into the online marketplace and checks item order details using the store terminal 3. Terminal devices of a store in an online marketplace of a country except the first country may also exist.

Each user terminal 4 is a terminal device of a user who purchases items mainly from the domestic online marketplace. The user terminal 4 accesses the domestic online marketplace server 1 in accordance with an operation performed by the user to receive a web page from the domestic online marketplace server 1 and displays the web page. The user terminal 4 has software, such as a browser and an email client, installed on it. For example, a personal computer, a personal digital assistant (PDA), a mobile information terminal such as a smartphone, or a mobile phone is used as the user terminal 4.

A user can select an item to order and then specify where to ship the selected item. In that case, the problem that the selected item cannot be shipped to the specified destination may occur.

For example, if it determines based on the IP address of the user terminal 4 that a user is located in the first country (e.g., Japan), the domestic online marketplace server 1 allows items of all stores to be provided. The user selects an item as a gift to give to one of his or her friends abroad (e.g., in France). Thus, the user specifies a foreign address as the destination. If the store that sells the selected item does not offer international shipping, the selected item cannot be shipped. Also if the selected item is prohibited in the destination country, the selected item cannot be shipped.

Alternatively, for example, assume that a user living in another country (e.g., Japan) than the first country (e.g., the United States) is on a business trip to the first country. The user happens to visit a domestic online marketplace (American online marketplace) and select an item. The user then specifies his or her address in the other country as the destination. If the store that sells the selected item does not offer international shipping, the selected item cannot be shipped.

Alternatively, for example, assume that the domestic online marketplace server 1 covers a plurality of first countries (e.g., France, United Kingdom, Germany, Austria, and Spain). For example, assume that a user selects an item of a store in France and specifies the United Kingdom as the destination. If the store does not offer cross-border shipping, the selected item cannot be shipped. Also if the selected item is prohibited in the United Kingdom, the selected item cannot be shipped.

If the selected item cannot be shipped to the specified destination, the user's effort spent in selecting the item was wasted. This effort may include the effort of searching for items or the effort of considering which item to select. In this case, the user may have to search or consider again to select another item.

For this reason, if the specified destination is outside the area to which the selected item can be shipped, the domestic online marketplace server 1 causes the user terminal 4 to display substitute information. The substitute information can identify a substitute item that can be shipped to the destination. By selecting and ordering the substitute item identified by the substitute information, the user can save himself or herself the effort of searching or considering again to select another item. Thus, even if an item first selected by a user cannot be shipped to its destination, the user can order another item without wasting the effort spent in selecting the item.

1-2. Configuration of Domestic Online Marketplace Server

The following describes a configuration of the domestic online marketplace server 1 with reference to FIGS. 2 and 3. FIG. 2 is a block diagram schematically showing an example configuration of the domestic online marketplace server 1 according to this embodiment. As shown in FIG. 2, the domestic online marketplace server 1 includes a communication unit 11, a storage unit 12, an input/output interface 13, and a system controller 14. The system controller 14 and the input/output interface 13 are connected via a system bus 15.

The communication unit 11 connects to the network NW and controls the state of communications with the foreign online marketplace servers 2, the store terminals 3, the user terminals 4, and the like.

The storage unit 12 includes, for example, hard disk drives. The storage unit 12 is an example of storage means of the present invention. This storage unit 12 stores a member DB 12a, a server DB 12b, a prohibited item DB 12c, a store DB 12d, an item DB 12e, a shopping basket DB 12f, an order DB 12g, and other databases. "DB" is an abbreviation for database.

FIG. 3 is a diagram showing example database entries. The member DB 12a stores member information about users who have signed up for the domestic online marketplace. Specifically, the member DB 12a stores, for each user, the user's user ID, password, nickname, name, birth date, gender, zip code, address, telephone number, email address, credit card information, and other user attributes in association with each other, as member information.

The server DB 12b stores information about the foreign online marketplace servers 2. Specifically, the server DB 12b stores, for each foreign online marketplace server 2, the IP address of the foreign online marketplace server 2 and the country number of a country that the foreign online marketplace server 2 covers. The country number is identification information identifying a country.

The prohibited item DB 12c stores information about prohibited items. Specifically, the prohibited item DB 12c stores, for each of the categories of items prohibited in at least one country, its category ID, an import prohibited country list, and an export prohibited country list. The category ID is identification information identifying the category of the item. The import prohibited country list is a list of the country numbers of countries in which import of items in the category identified by the category ID is prohibited. The export prohibited country list is a list of the country numbers of countries in which export of items in the category identified by the category ID is prohibited. For example, the import prohibited country list and the export prohibited country list may be each a list of countries in which import or export is prohibited, according to postal types.

The store DB 12d stores store information about stores in the domestic online marketplace. Specifically, the store DB 12d stores, for each store, the store's store ID, password, name, zip code, address, telephone number, fax number, and email address, the IP address of a store terminal 3, delivery area information, and other store attributes in association with each other, as store information. The store ID is identification information of the store. The delivery area information is information indicating destination area to which the store in question offers delivery. The delivery area information can be set and changed by the store. The delivery area information may be, for example, an international shipping flag. If the international shipping flag is TRUE, the store offers international shipping. That is, items that the store in question sells can be shipped both to the first country and abroad. If the international shipping flag is FALSE, the store does not offer international shipping. That is, items that the store in question sells can be shipped only to the first country. Alternatively, for example, the delivery area information may be a list of country numbers of countries to which items can be shipped. In this case, the delivery area information may always include the country number of the first country. Also, for example, if the domestic online marketplace server 1 covers a plurality of first countries, the delivery area information may include the country number of at least one of the first countries.

The item DB 12e stores item information about items being sold in the domestic online marketplace. The item information includes information entered by stores. Specifically, the item DB 12e stores, for each of the items that the stores sell, a store ID, the item's item ID, product code, category ID, trade name, and price, and other information in association with each other, as item information. The store ID indicates a store that sells the item. The item ID is identification information of the item, which the store assigned to manage the item for sale. In this embodiment, from among the items being sold in the domestic online marketplace, a specific item of a specific store can be identified using a combination of a store ID and an item ID. However, a specific item of a specific store may be able to be identified using only an item ID. The product code is a code number identifying the corresponding item. When a plurality of stores sell the same items, each of the items is assigned the same product code. Examples of the product code include a Japanese article number (JAN) code, a European article number (EAN) code, and a product code used in a standard common to a plurality of online marketplaces. The category ID indicates a category to which the corresponding item belongs. The trade name is a name that the store gave the item. The store can include, for example, a message as well as the official name, common name, or the like of the item in the trade name.

The shopping basket DB 12f stores shopping basket information about items in shopping baskets. Each shopping basket is a virtual container to which an item selected for order by a user is added, in the domestic online marketplace. The shopping basket may be, for example, a shopping cart. The shopping basket DB 12f stores, for each of the items in the shopping baskets, a shopping basket ID, a user ID, a store ID, an item ID, an item quantity, a substitute flag, pre-change item information, and other information in association with each other, as shopping basket information. The shopping basket ID is identification information of the shopping basket information. The user ID indicates the user who added the item to a shopping basket. The combination of the store ID and the item ID indicates the item added to the shopping basket. The substitute flag indicates whether the item in the shopping basket is a substitute item. If the substitute flag is TRUE, the item is a substitute item. If the substitute flag is FALSE, the item is not a substitute item. When the item added to the shopping basket is a substitute item, the pre-change item information indicates an item replaced with the substitute item. The pre-change item information includes the store ID and the item ID of the replaced item.

The order DB 12g stores order information about orders for items. Specifically, each time the domestic online marketplace server 1 receives an order from a user, an order number, an order date and time, a user ID, a store ID, an item ID, the quantity of the item ordered, a substitute flag, pre-change item information, a total amount, a shipping fee, destination information, and other information are stored as order information in the order DB 12g. The order number is the identification number of the order. The order date and time indicates the date and time at which details of the order were received. The user ID indicates the user who ordered the item. The store ID indicates the store that received the order. The item ID indicates the item ordered. When a plurality of types of items are ordered, a plurality of combinations each of which is a combination of an item ID of an item ordered, a quantity, a substitute flag, and pre-change item information are stored. The total amount is the sum of the subtotals of all items ordered. Each subtotal is calculated by multiplying the price of the corresponding item by the quantity of the item. The destination information is information that the user specified as the destination of the item ordered. The destination information may include, for example, the name of the recipient of the item ordered, a destination zip code, an address, and a telephone number.

The storage unit 12 further stores an IP address/country table. The IP address/country table is a table for identifying which country a terminal device is located in, based on the IP address of the terminal device. Specifically, the IP address/country table stores, for each IP address range, the IP address range and a country number corresponding to the IP address range in association with each other.

The storage unit 12 further stores various data, such as hypertext markup language (HTML) documents, extensible markup language (XML) documents, image data, text data, and electronic documents, for displaying web pages. The storage unit 12 also stores various set values. One type of web page for which an HTML document stored in the storage unit 12 is an item page. The item page is a web page that displays information about an item. The item page may be generated by the domestic online marketplace server 1, for example, based on the item information stored in the item DB 12e.

The storage unit 12 also stores various programs, such as an operating system, a World Wide Web (WWW) server program, a database management system (DBMS), and an e-commerce control program. The e-commerce control program is a program for performing processes related to e-commerce in the domestic online marketplace. The various programs may be available from, for example, another server device over the network NW. Alternatively, the various programs may be recorded in a recording medium, such as a magnetic tape, an optical disk, or a memory card, and be read via a drive device. The e-commerce control program and other programs may be program products.

The input/output interface 13 performs interface processing between the communication unit 11 and the storage unit 12, and the system controller 14.

The system controller 14 includes, for example, a central processing unit (CPU) 14a, a read only memory (ROM) 14b, and a random access memory (RAM) 14c. The CPU 14a is an example processor. The present invention can also be applied to various processors that differ from CPUs. The storage unit 12, the ROM 14b, and the RAM 14c are each an example memory. The present invention can also be applied to various memories that differ from hard disks, ROMs, and RAMs.

The domestic online marketplace server 1 may include a plurality of server devices. For example, a server device that processes item orders in the online marketplace, a server device that sends web pages in response to requests from the store terminals 3 and the user terminals 4, a server device that manages databases, and other server devices may be connected to each other via a LAN or the like.

1-3. Configuration of Foreign Online Marketplace Server

The following describes a configuration of each foreign online marketplace server 2 with reference to FIG. 4. FIG. 4 is a block diagram schematically showing an example configuration of the foreign online marketplace server 2 according to this embodiment. As shown in FIG. 4, each foreign online marketplace server 2 includes a communication unit 21, a storage unit 22, an input/output interface 23, and a system controller 24. The system controller 24 and the input/output interface 23 are connected via a system bus 25.

The communication unit 21 connects to the network NW and controls the state of communications with the domestic online marketplace server 1, the user terminals 4, and the like.

The storage unit 22 includes, for example, hard disk drives. This storage unit 22 stores a store DB 22a, an item DB 22b, and other databases. The storage unit 22 may store a member DB, a shopping basket DB, and an order DB that respectively have essentially the same data structure as the member DB 12a, the shopping basket DB 12f, and the order DB 12g.

The store DB 22a stores store information about stores in an online marketplace of a country that the foreign online marketplace server 2 covers. For example, the store DB 22a may have essentially the same data structure as a store DB 12d. The delivery area information in the store DB 22a may be an international shipping flag. If the international shipping flag is TRUE, items that the store in question sells can be shipped both to the country that the foreign online marketplace server 2 covers and abroad from the country. If the international shipping flag is FALSE, items that the store in question sells can be shipped only to the country that the foreign online marketplace server 2 covers. Alternatively, for example, the delivery area information may be a list of country numbers of countries to which items can be shipped. In this case, the delivery area information may always include the country number of the country that the foreign online marketplace server 2 covers. Also, for example, if the foreign online marketplace server 2 covers a plurality of countries, the delivery area information may include the country number of at least one of the plurality of countries.

The item DB 22b stores item information about items being sold in the online marketplace of the country that the foreign online marketplace server 2 covers. For example, the item DB 22b may have essentially the same data structure as the item DB 12e.

The storage unit 22 further stores various data, such as HTML documents, XML documents, image data, text data, and electronic documents, for displaying web pages including item pages. The storage unit 22 also stores various set values.

The storage unit 22 also stores various programs, such as an operating system, a WWW server program, a DBMS, and an e-commerce control program. The e-commerce control program is a program for performing processes related to e-commerce in the foreign online marketplace. The various programs may be available from, for example, another server device over the network NW. Alternatively, the various programs may be recorded in a recording medium, such as a magnetic tape, an optical disk, or a memory card, and be read via a drive device. The e-commerce control program and other programs may be program products.

The input/output interface 23 performs interface processing between the communication unit 21 and the storage unit 22, and the system controller 24.

The system controller 24 includes, for example, a CPU 24a, a ROM 24b, and a RAM 24c.

The foreign online marketplace server 2 may include a plurality of server devices. For example, a server device that processes item orders in the online marketplace, a server device that sends web pages in response to requests from the store terminals 3 and the user terminals 4, a server device that manages databases, and other server devices may be connected to each other via a LAN or the like.

Figure 5:
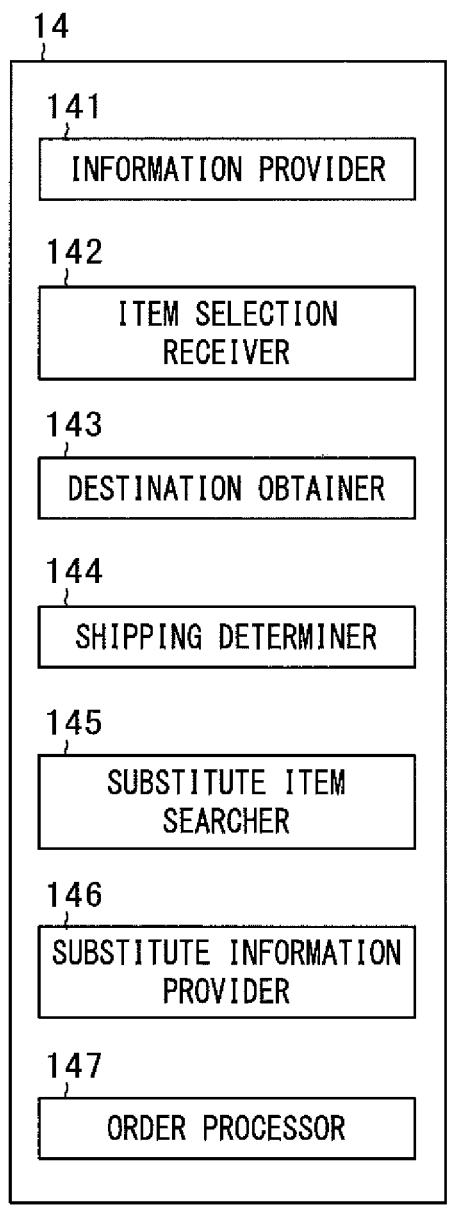
FIG. 5 is a diagram showing example functional blocks of a system controller 14 of the domestic online marketplace server 1 according to an embodiment.

1-4. Functional Overview of System Controller of Domestic Online Marketplace Server The following describes a functional overview of the system controller 14 of the domestic online marketplace server 1 with reference to FIGS. 5 to 11. FIG. 5 is a diagram showing example functional blocks of the system controller 14 of the domestic online marketplace server 1 according to this embodiment. As shown in FIG. 5, the e-commerce management program and other programs, which are read and executed by the CPU 14a, enable the system controller 14 to function as, for example, an information provider 141, an item selection receiver 142, a destination obtainer 143, a shipping determiner 144, a substitute item searcher 145, a substitute information provider 146, and an order processor 147.

The information provider 141 is an example of element display control means, providing means, and output means of the present invention. The item selection receiver 142 is an example of receiving means of the present invention. The destination obtainer 143 is an example of obtaining means and destination area obtaining means of the present invention. The shipping determiner 144 is an example of area information retrieval means and address obtaining means of the present invention. The substitute item searcher 145 is an example of search means and search control means of the present invention. The substitute information provider 146 is an example of display control means and replacing means of the present invention. The order processor 147 is an example of determining means of the present invention.

In response to a request from a user terminal 4, the information provider 141 sends a predetermined page of the domestic online marketplace to the user terminal 4. For example, the information provider 141 sends an item page stored in the storage unit 12. FIG. 6A is a diagram showing an example item page. As shown in FIG. 6A, the item page displays detailed information about one item. For example, the item's trade name, item ID, price, description, and images are displayed. The item page further displays an "Add to Basket" button 110. The "Add to Basket" button 110 is a button for selecting the item about which information is being displayed on the item page as an item to add to a shopping basket. FIG. 6A shows an item page for an item A that a store X sells.

The item selection receiver 142 receives selection of an item for order from a user. For example, when the user presses the "Add to Basket" button 110 on the item page, the user terminal 4 sends a shopping basket request to the domestic online marketplace server 1. The shopping basket request includes the store ID and the item ID of the selected item, and the user ID of the user who made the selection. The user terminal 4 of the user logging in to the domestic online marketplace stores the user ID, for example, as a cookie. Thus, the user terminal 4 of the user logging in to the domestic online marketplace sends a request including the user ID to the domestic online marketplace server 1. The item selection receiver 142 stores shopping basket information corresponding to the shopping basket request in the shopping basket DB 12f. The item selection receiver 142 then sends a shopping basket page to the user terminal 4. FIG. 6B is a diagram showing an example shopping basket page. The shopping basket page displays information about an item in the user's shopping basket. FIG. 6B shows a shopping basket page that is displayed when the "Add to Basket" button 110 is pressed on the item page shown in FIG. 6A. As shown in FIG. 6B, at least one piece of store shopping basket information 210 is displayed. The store shopping basket information 210 is information about an item that a user added to his or her shopping basket in one store. For example, the store shopping basket information 210 includes an image, the trade name, and the price of an item in the shopping basket. If the user has added a plurality of items to his or her shopping basket in one store, the store shopping basket information 210 include information about the plurality of items. If the user has added items to his or her shopping baskets in a plurality of stores, a plurality of pieces of store shopping basket information 210 are displayed. The store shopping basket information 210 further includes a Delete button 211 and a Proceed-to-Checkout button 212. A Delete button 211 is displayed for each item in the shopping basket. A Proceed-to-Checkout button 244-2 is a button for deleting the corresponding item from the shopping basket. The Proceed-to-Checkout button 212 is a button for selecting an item in the shopping basket as an item to order, in the store corresponding to in the store shopping basket information 210. The user selects an item to order by pressing the Proceed-to-Checkout button 212. Thus, the item selection receiver 142 receives the item selected for order, from the shopping basket. When the Proceed-to-Checkout button 212 is pressed, the user terminal 4 sends an order processing request to the domestic online marketplace server 1. The order processing request includes the store ID and the item ID of the selected item, and the user ID of the user who made the selection. FIG. 6B shows a shopping basket page where an item A that the store X sells and items B1 and B2 that a store Y sells are in corresponding shopping baskets.

After the item selection receiver 142 receives selection of an item, the destination obtainer 143 obtains the destination specified for the selected item by the user. For example, destination obtainer 143 sends an order details review page to the user terminal 4. FIG. 7 is a diagram showing an example order details review page. The order details review page is a web page for a user to specify and review order details and to change the order details as appropriate. FIG. 7 shows a shopping basket page that is displayed when the Proceed-to-Checkout button 212 corresponding to the store X is pressed on the shopping basket page shown in FIG. 6B. As shown in FIG. 7, the order details review page displays, for example, information 310 about the selected item, a payment method 320, a shipping method 330, orderer information 340, a destination information 350, and a Place-order button 360. In the orderer information 340, the name, the zip code, the address, and the telephone number of a user who will place his or her order are displayed. In the destination information 350, information about a destination is displayed. The initial destination is the name, the zip code, the address, and the telephone number of the user who will place his or her order are displayed. In the example of FIG. 7, the destination country is Japan. The destination information 350 includes a Change button 351. The Change button 351 is a button for changing the destination. The Place-order button 360 is a button for placing the order in accordance with the details being displayed on the order details review page.

If the user presses the Change button 351, the user terminal 4 displays a destination change window. FIG. 8 is a diagram showing an example destination change window. The destination change window is a window for specifying a new destination. As shown in FIG. 8, the destination change window includes a name entry field 410, a zip code entry field 420, a prefecture selection list 430, a city entry field 440, an address entry field 450, a telephone number entry field 460, and a Change button 470. The name entry field 410 is an entry field for entering the name of a recipient of the selected item. The zip code entry field 420 is an entry field for entering a destination zip code. A prefecture selection list 430 is a pull-down list for entering a destination prefecture. When specifying a country except the first country as the destination, the user selects "foreign country" from the prefecture selection list 430. The city entry field 440 is an entry field for entering a destination administrative division. When specifying a country except the first country as the destination, the user enters a country name in the prefecture selection list 440. The address entry field 450 is an entry field for entering the remaining shipping address, excluding what are specified in the prefecture entry field 430 and the city entry field 440. The telephone number entry field 460 is an entry field for entering a destination telephone number. The Change button 470 is a button for changing the destination to a new address specified in the name entry field 410 to the telephone number entry field 460.

FIG. 9 is a diagram showing an example order details review page after the destination is hanged. When the user presses the Change button 470 in the destination change window, the order details review page displays information about the new destination. In the order details review page shown in FIG. 9, the destination is changed from Japan to the United States. When the user presses the Place-order button 360, the user terminal 4 sends an order placing request to the online marketplace server 1. The order placing request includes, for example, the item ID, the store ID, the quantity, and the destination information of the selected item, the user ID of the user who has placed the order. The destination obtainer 143 obtains the destination information included in the order placing request received via the communication unit 11 as a destination. The destination obtainer 143 may obtain, as a destination, only information (e.g., the country name) required to determine whether the item can be shipped, for example, from the destination information. Also for example, when the Change button 470 is pressed in the destination change window, the user terminal 4 may send new destination information specified in the destination change window to the domestic online marketplace server 1. The destination obtainer 143 may obtain this destination information as a destination.

The shipping determiner 144 determines whether the specified destination is within the area to which the item selected for order can be shipped. For example, when the Place-order button 360 is pressed on the order details review page, the shipping determiner 144 may make this determination. Alternatively, for example, when the Change button 470 is pressed in the destination change window, the shipping determiner 144 may make this determination.

The shipping determiner 144 may determine whether, for example, the store that sells the selected item offers item shipping to the specified destination. If the store offers item shipping to the specified destination, the specified destination is within the area to which the selected item can be shipped. If not, the specified destination is outside the area to which the selected item can be shipped. For example, the shipping determiner 144 retrieves delivery area information corresponding to the store ID included in the order processing request or the order placing request from the store DB 12d. The shipping determiner 144 determines whether the store offers shipping to the destination, based on the destination information obtained by the destination obtainer 143 and on the retrieved delivery area information. For example, assume that the delivery area information is an international shipping flag. If the international shipping flag is TRUE, the shipping determiner 144 may determine that the store offers shipping to the destination. If the international shipping flag is FALSE, the shipping determiner 144 determines whether the specified destination country is the first country. If the specified destination country is the first country, the shipping determiner 144 determines that the store offers shipping to the destination. If not, the shipping determiner 144 determines that the store does not offer shipping to the destination. For example, assume that the delivery area information is a list of country numbers of countries to which items can be shipped. If the list of the country numbers includes the country number of the destination country, the shipping determiner 144 determines that the store offers shipping to the destination. If not, the shipping determiner 144 determines that the store does not offer shipping to the destination.

The shipping determiner 144 may determine whether, for example, the selected item is a prohibited item. If the item is a prohibited item, the specified destination is outside the area to which the selected item can be shipped. If the item is not a prohibited item, the specified destination is within the area to which the selected item can be shipped. For example, the shipping determiner 144 retrieves the category ID corresponding to the item ID included in the order processing request or the order placing request from the item DB 12e. The shipping determiner 144 retrieves the import prohibited country list and the export prohibited country list that correspond to the category ID. If the import prohibited country list includes the country number of the destination country, the selected item is a prohibited item. If not, the selected item is not a prohibited item. If the export prohibited country list includes the country number of the first country, the selected item is a prohibited item. If not, the selected item is not a prohibited item. When the domestic online marketplace server 1 covers a plurality of first countries, for example, the shipping determiner 144 may determines whether the selected item is a prohibited item, based on the address of the store that sells the selected item. If the export prohibited country list includes the country number of the country in which the store is located, the selected item is a prohibited item. If not, the selected item is not a prohibited item.

In this embodiment, the shipping determiner 144 determines both whether the store that sells the selected item offers item shipping to the specified destination and whether the selected item is a prohibited item. However, some systems may determine only either one of them.

If the shipping determiner 144 determines that the specified destination is outside the area to which the item selected for order can be shipped, the substitute item searcher 145 determines a substitute item that substitutes for the selected item and that can be shipped to the specified destination.

The shipping determiner 144 may determine one substitute item or may determine a plurality of substitute items. The substitute item may be, for example, an item that is the same as or similar to the selected item and that is sold by another store than the store that sells the selected item. For example, the substitute item may be an item that is assigned the same product code as the selected item. Also for example, the substitute item may be an item that belongs to the same category as the selected item. Also for example, the substitute item may be an item that belongs to the same category as the selected item and that has a trade name similar to the trade name of the selected item.

If the store that sells the selected item does not offer item shipping to the specified destination, the substitute item searcher 145 may determine, for example, an item of a store that offers item shipping to the specified destination to be a substitute item. The store that sells the substitute item may be, for example, a store in the domestic online marketplace. The substitute item searcher 145 can search the store DB 12d for information about stores that offer item shipping to the specified destination, among the stores in the domestic online marketplace, in the same way as the shipping determiner 144 makes the determination.

If the specified destination country is a country covered by a foreign online marketplace, the substitute item searcher 145 may determine, for example, an item being sold in the foreign online marketplace to be a substitute item. All stores in an online marketplace of the specified destination country offer item shipping to the country. In addition, stores in an online marketplace of a certain country are likely to be located in the country. Thus, it is likely to be more convenient to send the item from a store in an online marketplace of the country than to send an item from a store in an online marketplace of the first country. For example, lower shipping fees and shorter shipping times are more convenient for users. The substitute item searcher 145 may request a foreign online marketplace server 2 that covers the destination country to search for substitute items. The foreign online marketplace server 2 searches the item DB 22b for substitute items and sends the results of the search to the domestic online marketplace server 1.

The substitute item searcher 145 may determine an item being sold in an online marketplace of a country except the specified destination country and the first country to be a substitute item. In this case, the store that sells the substitute item is a store that offers shipping to the specified destination. Also in this case, the substitute item searcher 145 may request a foreign online marketplace server 2 that covers the destination country to search for substitute items. The foreign online marketplace server 2 searches for stores that offer shopping the specified destination, for example, based on the delivery area information stored in the item DB 22b.

The foreign online marketplace server 2 then searches the item DB 22b for item information about substitute items being sold by the stores that offer shipping to the destination and sends the results of the search to the domestic online marketplace server 1.

If the selected item is a prohibited item, the substitute item searcher 145 may determine, for example, an item being sold in an online marketplace of the destination country to be a substitute item. If import of the selected item is allowed in the specified country but export of the selected item from the first country is prohibited, the substitute item searcher 145 may determine, for example, an item being sold in an online marketplace of a country that is not the destination country and in which export of the selected item is allowed, to be a substitute item. In this case, the store that sells the substitute item is a store that offers shipping to the specified destination. If the selected item is a prohibited item, the substitute item searcher 145 may request a foreign online marketplace server 2 to search for substitute items.

The substitute information provider 146 causes the user terminal 4 to display substitute information for identifying the substitute item determined by the substitute item searcher 145. The substitute information only needs to include at least information from which the substitute item can be identified. For example, the substitute information only needs to include at least the trade name, an image, or the trademark of the substitute item. Also for example, there may be a case where the substitute item can be identified from the name of the store that sells the substitute item. In this case, the substitute information only needs to include at least the name or the trademark of the store. The substitute information may include the difference between the selected item and the substitute item. This difference may be, for example, the difference in order total or the difference in shipping time. The order total may include shipping. Also for example, when displaying the trade name as the substitute information, part of the trade name of the substitute item that is the difference from the trade name of the selected item may be highlighted. Displaying the substitute information can save himself or herself the effort of finding substitutes for the selected item. This can prevent a user who has selected an item from wasting the effort.

For example, when the user specifies a destination that is outside the area to which the selected item cannot shipped and then presses the Change button 470 in the destination change window, the substitute information provider 146 may cause the substitute information to be displayed. Alternatively, for example, when the specified destination that is outside the area to which the selected item cannot shipped and the user presses the Order button 360 in the order details review page, the substitute information provider 146 may cause the substitute information to be displayed.

The substitute information provider 146 may cause the substitute information to be displayed so that the substitute item can be selected. For example, the substitute information provider 146 may display an element, such as a button, associated with the substitute information. Alternatively, the substitute information may be displayed so that it can be selected. When the user selects the substitute item, the substitute information provider 146 replaces the initially selected item in his or her shopping basket with the selected substitute item. For example, the substitute information provider 146 changes the store ID and the item ID in the corresponding shopping basket information in the shopping basket DB 12f from the store ID and the item ID of the initially selected item to the store ID and the item ID of the selected substitute item. This allows the user to easily change an item to select for order from the initially selected item to the substitute item with a simple operation.

Figure 10:
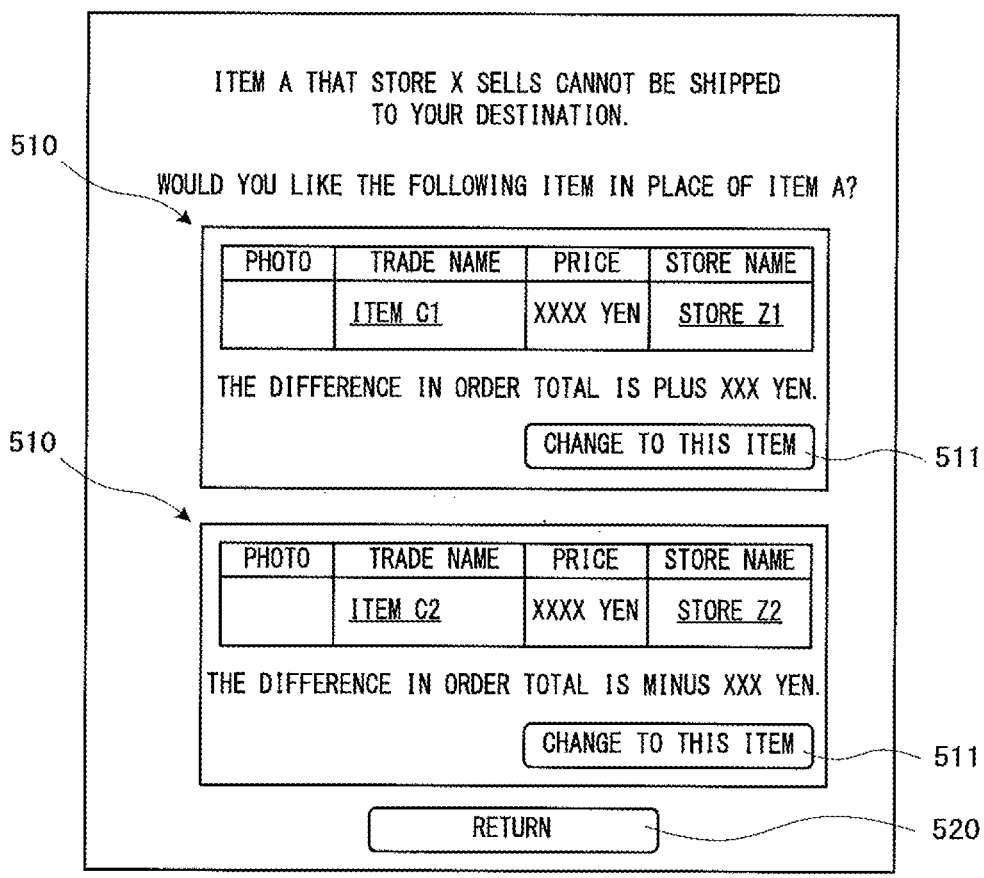
FIG. 10 is a diagram showing an example substitute information window.

The substitute information provider 146 may cause the user terminal 4 to display, for example, a substitute information window. FIG. 10 is a diagram showing an example of the substitute information window. FIG. 10 is an example where the specified destination country is the United States and the store X does not offer shipping to the United States as shown in FIG. 9. In the substitute information window, one or more pieces of substitute information 510 are displayed for each selected item. In the substitute information window, a Return button 520 is also displayed. In the example shown in FIG. 10, the substitute information 510 of an item C1 that a store Z1 sells and the substitute information 510 of an item C1 that a store Z2 sells are displayed. The items C1 and C2 are both substitutes for the item A. Both of the stores Z1 and Z2 offer shipping to the destination country. In the example shown in FIG. 10, each piece of substitute information 510 includes, for example, an image, the trade name, the price, and the store name of the corresponding substitute item. The substitute information 510 also includes a price difference. The substitute information 510 further includes a Replace button 511. The Replace button 511 is an operation element for selecting the corresponding substitute item. The Replace button 511 may be displayed, for example, outside the substitute information 510. The Return button 520 is a button for clearing the substitute information window and then redisplaying the order details review page. In this case, the user can change the destination.

When the user presses one of the Replace buttons 511 of the pieces of substitute information 510, the user terminal 4 displays the shopping basket page. At this time, the substitute information provider 146 replaces the initially selected item in the shopping basket with the selected substitute item. FIG. 11 is a diagram showing an example shopping basket page displayed when the item C1 has been selected in the substitute information window shown in FIG. 10. In the shopping basket page shown in FIG. 11, the store shopping basket information 210 of the item A has been replaced with the store shopping basket information 210 of the item C1.

The substitute information provider 146 may not necessarily cause the substitute information to be displayed so that substitute item can be selected. For example, when the user selects the trade name in the substitute information 510, the information provider 141 sends an item page for the substitute item to the user terminal 4. On the item page, the user adds the substitute item to his or her shopping basket. On the shopping basket page, the user deletes the initially selected item from the shopping basket. Thus, the user can change the contents of the shopping basket.

In place of the shipping determiner 144 of the domestic online marketplace server 1, the user terminal 4 may determine whether the specified destination is within the area to which the item selected for order can be shipped. For example, the shipping determiner 144 may send an HTML document containing a script for making this determination as an HTML document for the order details review page or a destination change window to the user terminal 4. In this case, the shipping determiner 144 adds, for example, the delivery area information of the store that sells the selected item to the HTML document. When the Place-order button 360 or the Change button 470 is pressed, the user terminal 4 may make the determination using the destination information and the delivery area information contained in the HTML document, in accordance with the script written in the HTML document. The substitute item searcher 145 may search for substitute items before sending the HTML document for the order details review page or the destination change page. The substitute item searcher 145 may then add data for displaying the substitute information to the HTML document. If the specified destination is outside the area to which the selected item can be shipped, the user terminal 4 displays substitute information in accordance with the script.

The order processor 147 receives an order for the item selected by the user. If the destination specified by the user is within the area to which the item selected for order can be shipped, the order processor 147 receives the order. When the Place-order button 360 is pressed on the order details review page, the order processor 147 generates order information, based on the order placing request sent from the user terminal 4. The order processor 147 stores the generated order information in the order DB 12*g*.

1-5. How Information Processing System Works

The following describes how the information processing system S works, with reference to FIGS. 12 to 14B.

Figure 12:
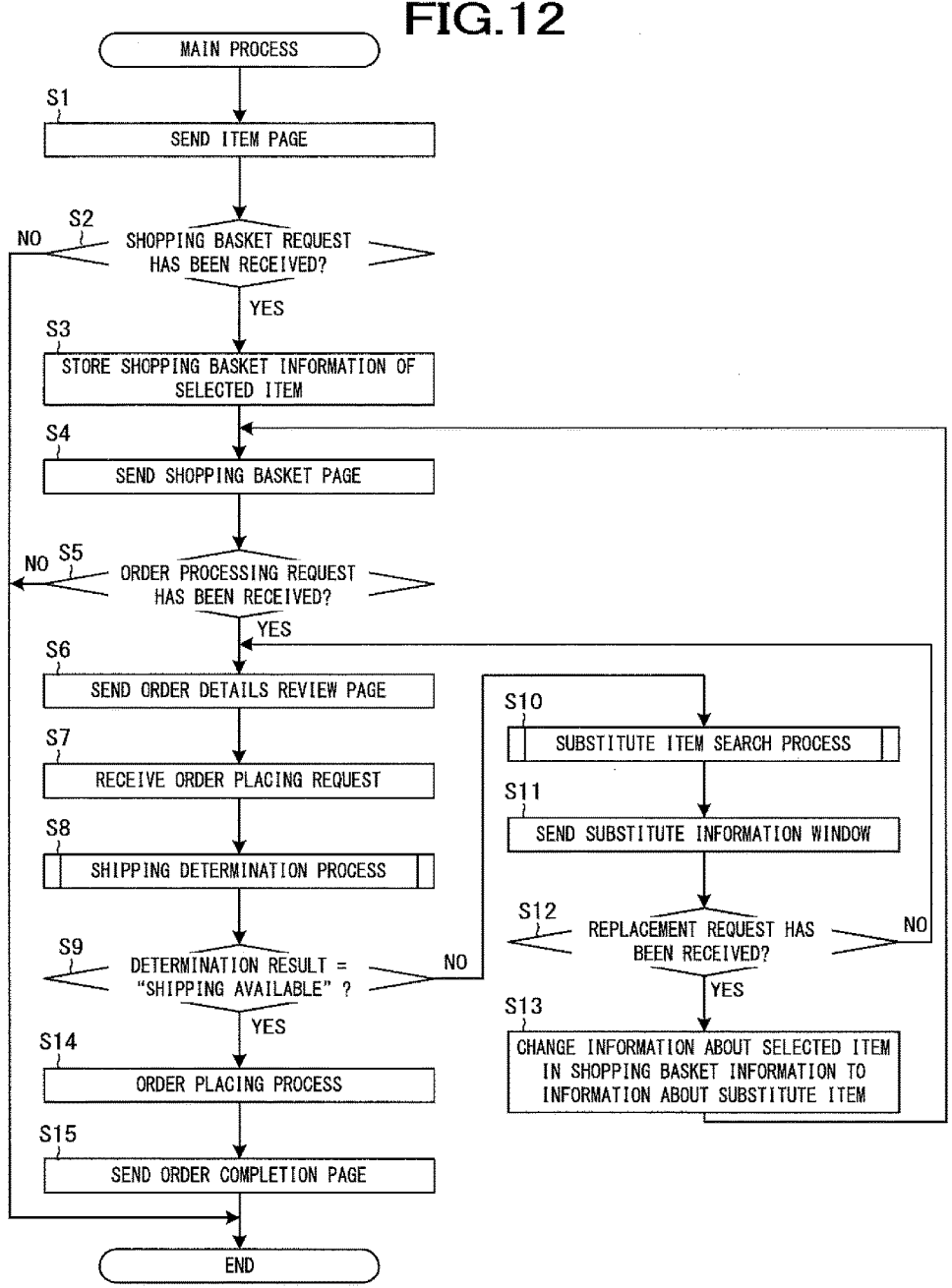
FIG. 12 is a flowchart showing an example main process in the system controller 14 of the domestic online marketplace server 1 according to an embodiment.

FIG. 12 is a flowchart showing an example main process in the system controller 14 of the domestic online marketplace server 1 according to this embodiment. For example, a user searches the domestic online marketplace for items, and his or her user terminal 4 displays a search results page. The search results page displays the resulting search results. The user selects an item from among the search results. The user terminal 4 then sends an item page request to the domestic online marketplace server 1. The item page request includes the store ID and the item ID of the selected item. When the item page request is received, the system controller 14 performs the main process.

As shown in FIG. 12, the information provider 141 sends an item page for the item identified by the store ID and the item ID included in the item page request to the user terminal 4 (Step S1). The user terminal 4 displays the item page sent from the domestic online marketplace server 1 on its display. The user who has viewed the item page performs some operation on the user terminal 4. For example, the user may press the "Add to Basket" button 110 or may perform an operation for requesting another web page. The user terminal 4 sends a request based on an operation performed by the user. When the "Add to Basket" button 110 is pressed, the user terminal 4 sends a shopping basket request.

When the request is received from the user terminal 4, the item selection receiver 142 determines whether the request is a shopping basket request (Step S2). If it determines that the request is not a shopping basket request (NO in Step S2), the item selection receiver 142 sends a web page that satisfies the request to the user terminal 4 and then terminates the main process. On the other hand, if the item selection receiver 142 determines that the request is a shopping basket request (YES in Step S2), the main process proceeds to Step S3.

In Step S3, the item selection receiver 142 stores shopping basket information including the user ID, the store ID, and the item ID that are included in the shopping basket request in the shopping basket DB 12*f*. In this step, the item selection receiver 142 sets the substitute flag in the shopping basket information to FALSE. Subsequently, the item selection receiver 142 sends a shopping basket page to the user terminal 4 (Step S4). For example, the item selection receiver 142 retrieves all shopping basket information corresponding to the user ID included in the shopping basket request from the shopping basket DB 12*f*. The item selection receiver 142 generates store shopping basket information 210 for each piece of shopping basket information including a different store ID. The item selection receiver 142 sends a shopping basket page including the pieces of store shopping basket information 210. The user terminal 4 displays the shopping basket page sent from the domestic online marketplace server 1 on its display. The user who has viewed the shopping basket page performs some operation on the user terminal 4. For example, the user may press the Proceed-to-Checkout button 212 or may perform an operation for requesting another web page. The user terminal 4 sends a request based on an operation performed by the user. When the Proceed-to-Checkout button 212 is pressed, the user terminal 4 sends an order processing request.

When the request is received from the user terminal 4, the item selection receiver 142 determines whether the request is an order processing request (Step S5). If it determines that the request is not an order processing request (NO in Step S5), the item selection receiver 142 sends a web page that satisfies the request to the user terminal 4 and then terminates the main process. On the other hand, if the item selection receiver 142 determines that the request is an order processing request (YES in Step S5), the main process proceeds to Step S6.

In Step S6, the item selection receiver 142 sends an order details review page to the user terminal 4. For example, the item selection receiver 142 retrieves the name, the zip code, the address, and the telephone number that correspond to the user ID included in the order processing request as initial destination information. The item selection receiver 142 sends an order details review page including the destination information. The user terminal 4 displays the order details review page sent from the domestic online marketplace server 1 on its display. The user who has viewed current order details on the order details review page may or may not change the destination. Finally, the user presses the Place-order button 360. The user terminal 4 then sends an order placing request to the domestic online marketplace server 1. The item selection receiver 142 receives the order placing request (Step S7). The item selection receiver 142 identifies, as the item selected for order, the item identified by the combination of a store ID and an item ID that are included in the order placing request.

Figure 13:
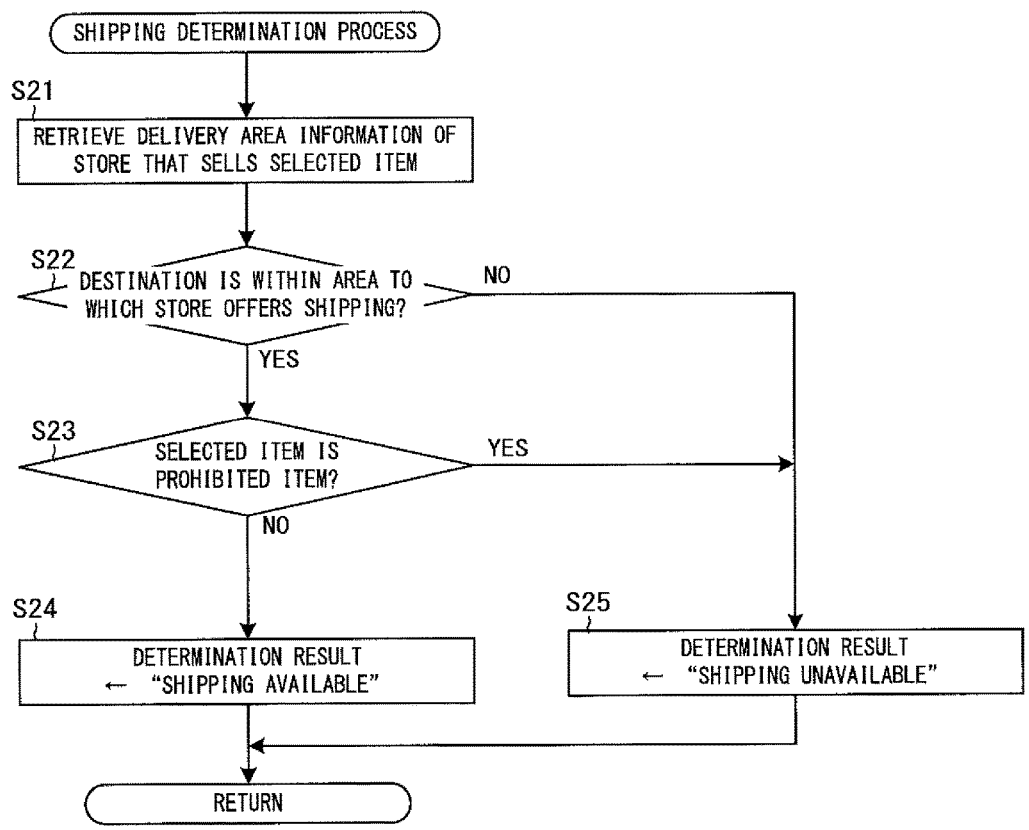
FIG. 13 is a flowchart showing an example of a shipping determination process in the system controller 14 of the domestic online marketplace server 1 according to an embodiment.

Subsequently, the shipping determiner 144 performs a shipping determination process (Step S8). FIG. 13 is a flowchart showing an example of the shipping determination process in the system controller 14 of the domestic online marketplace server 1 according to this embodiment. As shown in FIG. 13, the shipping determiner 144 retrieves the delivery area information of the store that sells the selected item (Step S21). For example, the shipping determiner 144 retrieves the delivery area information corresponding to the store ID included in the order placing request from the store DB 12d. Next, the shipping determiner 144 determines whether the destination specified by the user is within the area to which the store that sells the selected item offers shipping, based on the destination information included in the order placing request and on the retrieved delivery area information (Step S22). How to determine this is already described in detail. If the shipping determiner 144 determines that the destination is outside the area to which the store offers shipping (NO in Step S22), the shipping determination process proceeds to S25. In Step S25, the shipping determiner 144 sets the determination result to "shipping unavailable" and then terminates the shipping determination process. On the other hand, if the shipping determiner 144 determines that the destination is within the area to which the store offers shipping (YES in Step S22), the shipping determination process proceeds to S23.

In Step S23, the shipping determiner 144 determines whether the selected item is a prohibited item. For example, the shipping determiner 144 retrieves the category ID corresponding to the item ID included in the order placing request from the item DB 12e. If the retrieved category ID is not stored in the prohibited item DB 12c, the shipping determiner 144 determines that the selected item is not a prohibited item. If the retrieved category ID is stored in the prohibited item DB 12c, the shipping determiner 144 retrieves the import prohibited country list and the export prohibited country list that correspond to the category ID from the prohibited item DB 12c. If the import prohibited country list includes the country number of the destination country, the shipping determiner 144 determines that the selected item is a prohibited item. If the export prohibited country list includes the country number of the first country, the shipping determiner 144 determines that the selected item is a prohibited item. If the import prohibited country list does not include the country number of the destination country and the export prohibited country list does not include the country number of the first country, the shipping determiner 144 determines that the selected item is not a prohibited item. If the shipping determiner 144 determines that the selected item is a prohibited item (YES in Step S23), the shipping determination process proceeds to S25. On the other hand, if the shipping determiner 144 determines that the selected item is not a prohibited item (NO in Step S23), the shipping determination process proceeds to S24. In Step S24, the shipping determiner 144 sets the determination result to "shipping available" and then terminates the shipping determination process.

After the shipping determination process, the shipping determiner 144 determines whether the determination result is "shipping available" (Step S9). If the determination result is "shipping available" (YES in Step S9), the shipping determiner 144 causes the main process proceed to Step S14. On the other hand, if the determination result is not "shipping available" (NO in Step S9), the shipping determiner 144 causes the main process proceed to Step S10.

Figure 14A:
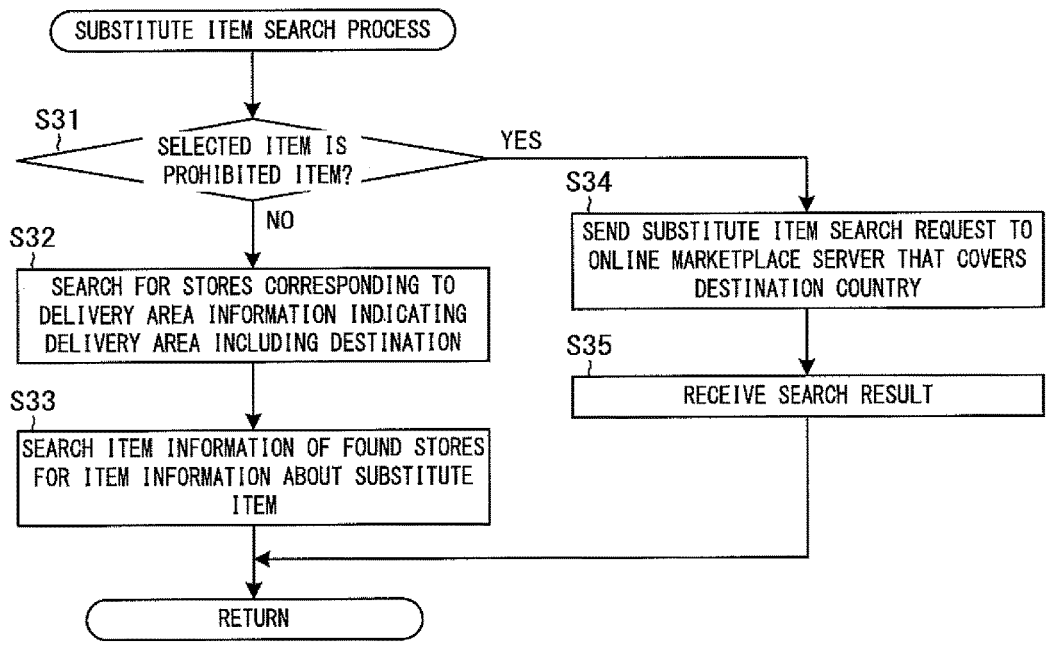
FIG. 14A is a flowchart showing an example of a substitute item search process in the system controller 14 of the domestic online marketplace server 1 according to an embodiment.

In Step S10, the substitute item searcher 145 performs a substitute item search process. FIG. 14A is a flowchart showing an example of the substitute item search process in the system controller 14 of the domestic online marketplace server 1 according to this embodiment. FIG. 14 shows an example where an item that is sold in the domestic online marketplace is determined to be a substitute item if the selected item is not a prohibited item and an item that is sold in an online marketplace of the destination country if the selected item is a prohibited item.

As shown in FIG. 14A, the substitute item searcher 145 determines whether the selected item is a prohibited item (Step S31). If the substitute item searcher 145 determines that the selected item is not a prohibited item (NO in Step S31), the substitute item search process proceeds to S32. On the other hand, if the substitute item searcher 145 determines that the selected item is a prohibited item (YES in Step S31), the substitute item search process proceeds to S34.

In Step S32, the substitute item searcher 145 searches for stores that offer shipping to the destination area, among the stores in the domestic online marketplace. For example, when the delivery area information is an international shipping flag, the substitute item searcher 145 searches the store DB 12d for store information in which the international shipping flag is TRUE. The substitute item searcher 145 obtains store IDs from store information found by the search, as the store IDs of stores that offer shipping to the destination area. For example, when the delivery area information is a list of country numbers, the substitute item searcher 145 searches the store DB 12$d$ for store information in which the list includes the country number of the destination country. The substitute item searcher 145 obtains store IDs from store information found by the search, as the store IDs of stores that offer shipping to the destination area.

Subsequently, the substitute item searcher 145 searches for a substitute item, among items that are sold by the stores that stores that offer shipping to the destination area (Step S33). For example, the substitute item searcher 145 searches an item DB 12$e$ for information about items identical or similar to the selected item, among the pieces of item information corresponding to the store IDs obtained in Step S32. For example, the substitute item searcher 145 may search for item information including a category ID or a product code that matches the category ID or the product code of the selected item. Also for example, the substitute item searcher 145 may search for item information including a trade name identical or similar to the trade name of the selected item. After Step S33, the substitute item searcher 145 terminates the substitute item search process.

In Step S34, the substitute item searcher 145 sends a substitute item search request to a foreign online marketplace server 2 that covers the destination country. The substitute item searcher 145 obtains the IP address of a foreign online marketplace server 2 corresponding to the country number of the destination country. The substitute item searcher 145 sends the substitute item search request, based on the obtained IP address. By sending the substitute item search request, the substitute item searcher 145 causes the foreign online marketplace server 2 to search for substitute items. The substitute item search request includes search criteria to search for substitute items. For example, the substitute item search request may include at least one of the following: the trade name, the category ID, and the product code of the selected item.

Figure 14B:
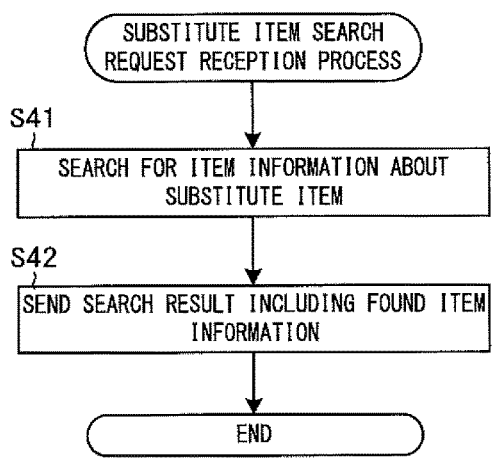
FIG. 14B is a flowchart showing an example of a substitute item search request reception process in a system controller 24 of the foreign online marketplace server 2 according to an embodiment.

FIG. 14B is a flowchart showing an example of a substitute item search request reception process in the system controller 24 of the foreign online marketplace server 2 according to this embodiment. When the substitute item search request is received from the domestic online marketplace server 1, the system controller 24 performs the substitute item search request reception process. As shown in FIG. 14B, the system controller 24 searches the item DB 22$b$ for item information about a substitute item, based on the search criteria included in the substitute item search request (Step S41). How to search in this step may be the same as that in Step S33 shown in FIG. 14A. Subsequently, the system controller 24 sends a search result including item information found by the search to the domestic online marketplace server 1 (Step S42).

As shown in FIG. 14A, the substitute item searcher 145 receives the search result sent from the foreign online marketplace server 2 (Step S35) and terminates the substitute item search process.

After the substitute item search process, the substitute information provider 146 causes the user terminal 4 to display the substitute information window (Step S11), as shown in FIG. 12. For example, the substitute information provider 146 may generate an HTML document for the substitute information window, based on the item information about the substitute item found in the substitute item search process. In this step, the substitute information provider 146 generate, for example, an HTML document for causing at least the trade name, an image, or the store name of the substitute item to be displayed. The substitute information provider 146 also generates the HTML document containing a tag for causing the Replace button 511 to be displayed. The substitute information provider 146 may generate information indicating the difference between the selected item and the substitute item, for example, based on item information about the selected item and the item information about the substitute item. The substitute information provider 146 may then add the information indicating the difference to the HTML document. The substitute information provider 146 sends the generated HTML document to the user terminal 4. Based on the HTML document received from the domestic online marketplace server 1, the user terminal 4 overlays the substitute information window, for example, on the order details review page. The user who has viewed the substitute information window presses the Replace button 511 or the Return button 520. When the Replace button 511 is pressed, the user terminal 4 sends a replacement request to the domestic online marketplace server 1. The replacement request includes the store ID and the item ID of the selected substitute item. When the Return button 520 is pressed, the user terminal 4 sends a return request to the domestic online marketplace server 1. The substitute information provider 146 receives a request from the user terminal 4.

The substitute information provider 146 determines whether the received request is a replacement request (Step S12). If the substitute information provider 146 determines that the received request is not a replacement request (NO in Step S12), the main process proceeds to S6. On the other hand, if the substitute information provider 146 determines that the received request is a replacement request (YES in Step S12), the main process proceeds to S13.

In Step S13, the substitute information provider 146 replaces the initially selected item in the shopping basket with the substitute item. For example, the substitute information provider 146 searches the shopping basket DB 12$f$ for shopping basket information including the store ID and the item ID that are included in the order placing request. The substitute information provider 146 changes the store ID and the item ID in shopping basket information found by the search to the store ID and the item ID of the substitute item. The substitute information provider 146 also changes the substitute flag in the shopping basket information to TRUE. The substitute information provider 146 also includes, in the shopping basket information, the store ID and the item ID that are included in the order placing request as pre-change item information. After Step S13, the system controller 14 performs Step S4.

In Step S14, the order processor 147 performs a process for placing the order. For example, the order processor 147 stores order information including a user ID, the store ID, the item ID, an item quantity, a total amount, a shipping fee, the destination information, and other information that are included in the order placing request in the order DB 12$g$. In this step, the order processor 147 obtains the substitute flag and the pre-change item information from the shopping basket information for the item ordered. The order processor 147 adds the obtained substitute flag and the obtained pre-change item information to the order information. Subsequently, the order processor 147 sends an order completion page to the user terminal 4 (Step S15) and terminates the main process. The order completion page is a web page including a message indicating that the order has been placed.

As described above, according to this embodiment, the system controller 14 receives selection of an item for order, among a plurality of items. The system controller 14 obtains a destination specified for the selected item. If the specified destination is outside the area to which the selected item can be shipped, the system controller 14 causes substitute information to be displayed. The substitute information can identify a substitute item that can be shipped to the destination. Thus, even if an item selected by a user cannot be shipped to its destination, the user can prevent his or her effort spent in selecting the item from going to waste.

The system controller 14 may identify a selected item from a shopping basket in the domestic online marketplace. The system controller 14 may cause the substitute information to be displayed so that the substitute item can be selected. When the substitute item is selected, the system controller 14 may replace the selected item in the shopping basket with the substitute item. This allows the user to change an item to order from an item that cannot be shipped to its destination to another item that can be shipped to its destination, with a simple operation.

2. Second Embodiment 2-1. Functional Overview of System Controller

The following describes a second embodiment. Except for points described below, the second embodiment is the same as the first embodiment. In this embodiment, when substitute information has been displayed for a user a set number of times or more, an information provider 14a causes an operation element for specifying a destination area to be displayed on a predetermined screen for allowing selection of items, among online shopping screens. The set number may be preset, for example, by an administrator of the domestic online marketplace. In this embodiment, the online shopping screens are web pages of the domestic online marketplace. The predetermined screen for allowing selection of items is, for example, a web page that allows a search for items. A user specifies search criteria on such a web page and requests the domestic online marketplace server 1 to perform a search. The user can select one of items found by the search and caused his or her user terminal 4 to display an item page. Such a web page may be, for example, a home page or a search results page. The operation element for specifying a destination area may be, for example, a group of link s or a group of buttons for selecting one of a plurality of areas. In this case, the number of areas as options only needs to be two or more. Alternatively, for example, the operation element for specifying a destination area may be an entry field for entering an area name. Alternatively, for example, the operation element for specifying a destination area may be a link or a button for displaying a screen for specifying a destination area. The user of the user terminal 4 that has displayed substitute information many times is a user who has specified countries except for the first country many times. The information provider 14a allows such a user to specify a destination area in advance.

Figure 15:
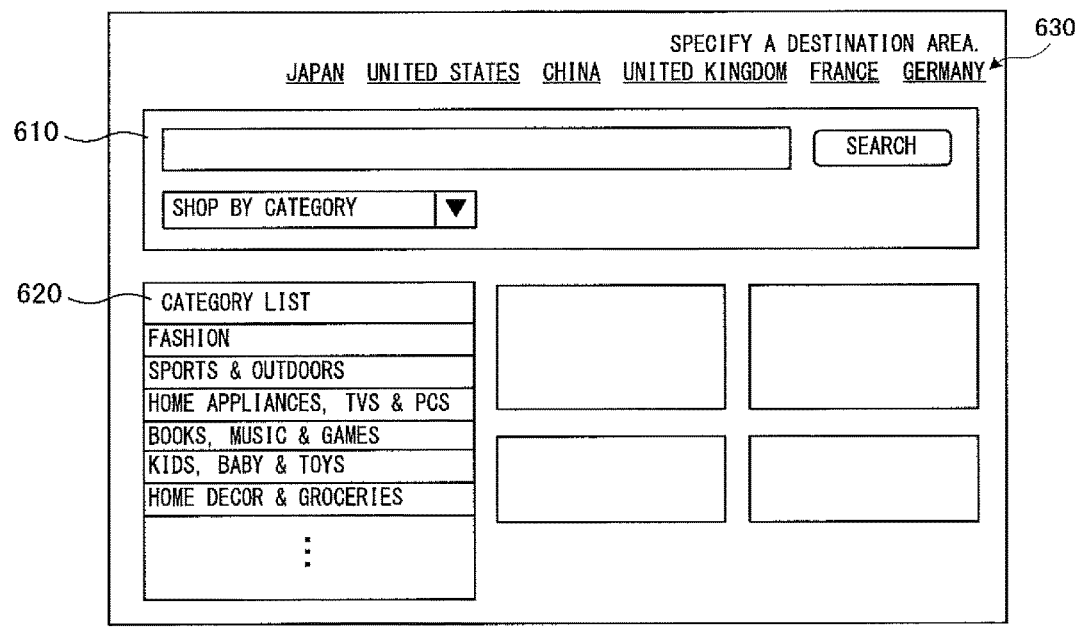
FIG. 15 is a diagram showing an example home page of a domestic online marketplace.

FIG. 15 is a diagram showing an example home page of the domestic online marketplace. As shown in FIG. 15, the home page includes, for example, a search criteria specification area 610 and a category list 620. The search criteria specification area 610 is an area for specifying search criteria. For example, the search criteria specification area 610 may include an entry field for entering a keyword, a pull-down menu for specifying a category, and a button for submitting search criteria. The category list 620 displays categories. The user can specify one of the categories in the category list 620 as search criteria. When substitute information has been displayed the set number of times or more, the home page further includes a country specification link group 630. The country specification link group 630 is an example of the operation element. The country specification link group 630 is a link group for specifying a destination country. In the example of FIG. 15, a destination is selectable from among Japan, the United States, China, the United Kingdom, France, and Germany.

The destination obtainer 143 obtains a destination area specified by the user, based on how the user has operated the operation element. For example, when the user selects one of the links in the country specification link group 630 on the home page shown in FIG. 15, the user terminal 4 sends a destination area registration request to the domestic online marketplace server 1. The destination area registration request includes destination area information and the user ID. The destination area information indicates the specified destination area. For example, the destination area information may be the country number of the country corresponding to the selected link. The destination obtainer 143 obtains the destination area registration request received via the communication unit 11. The destination obtainer 143 stores the destination area information in association with the user ID included in the destination area registration request in the member DB 12a.

The information provider 14a provides information about at least one item that can be shipped to the specified destination area, among a plurality of items that are sold in the domestic online marketplace. For example, when search criteria are specified on a web page for searching for items, the information provider 14a searches for items that match the search criteria. At this time, the information provider 14a searches for items that can be shipped to the specified destination area. The information provider 14a then sends a search results page that lists items found by the search to the user terminal 4. This can prevent the user from selecting an item that cannot be shipped to a destination that the user is likely to specify when placing an order later.

FIG. 16 is a diagram showing example entries in the member DB 12a. As shown in FIG. 16, the member DB 12a stores, for each user, the number of impressions and destination area information as well as the user's member ID to credit card information. The number of impressions is the number of times that substitute information was displayed. The initial value of the number of impressions is 0.

2-2. How Information Processing System Works

Figure 17:
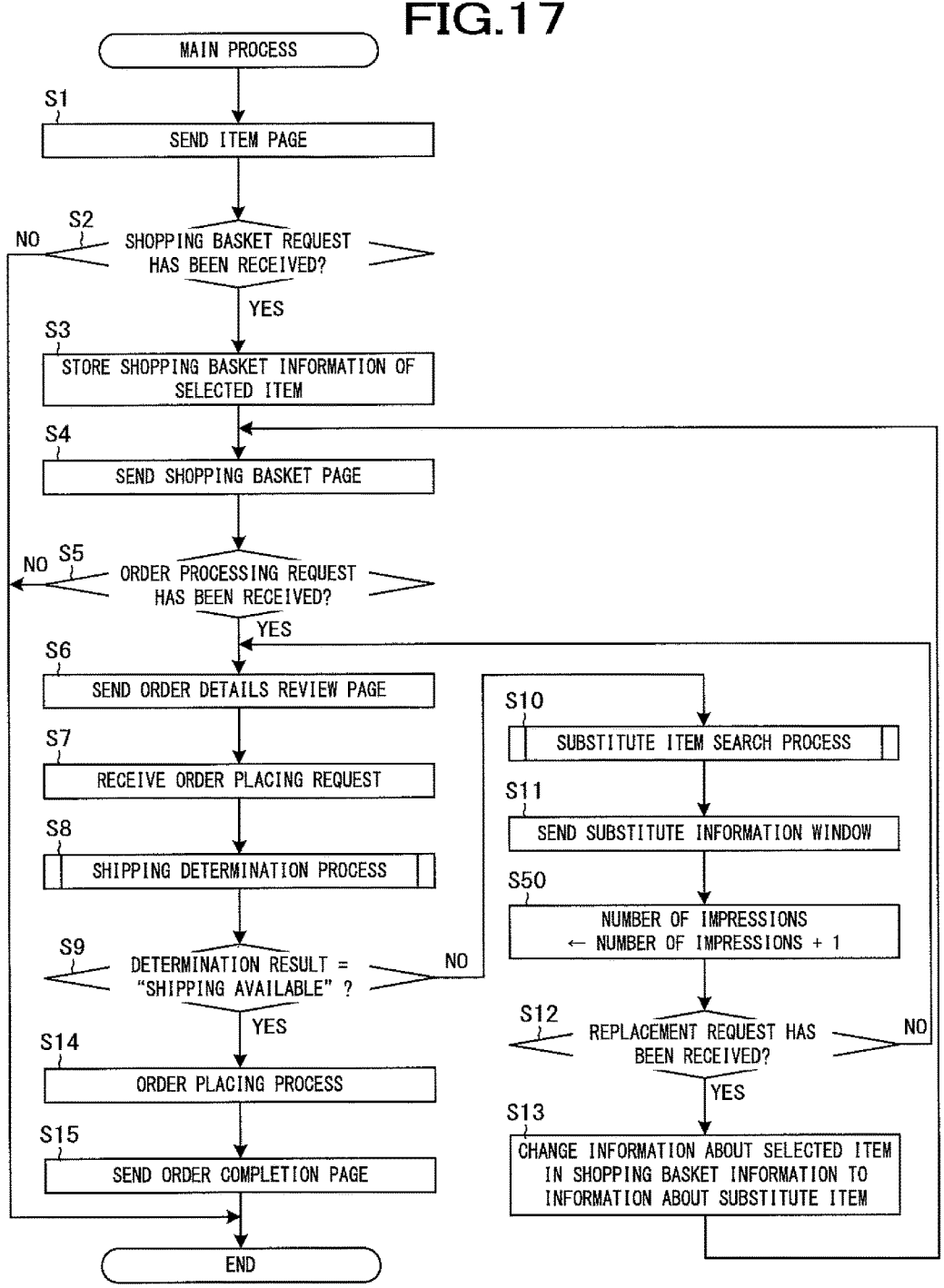
FIG. 17 is a flowchart showing an example main process in the system controller 14 of the domestic online marketplace server 1 according to an embodiment.
Figure 18A:
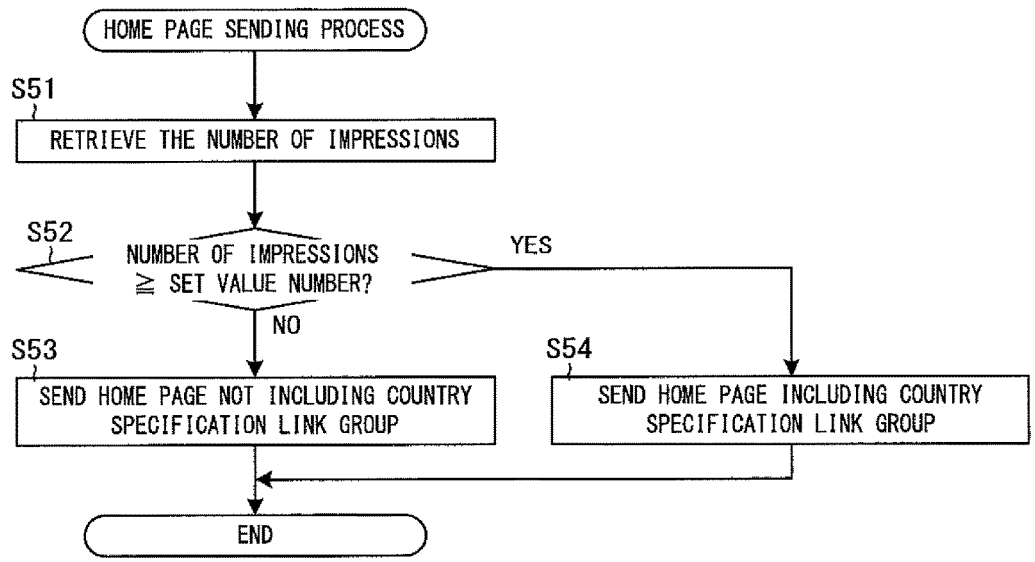
FIG. 18A is a flowchart showing an example of a home page sending process in the system controller 14 of the domestic online marketplace server 1 according to an embodiment.
Figure 18B:
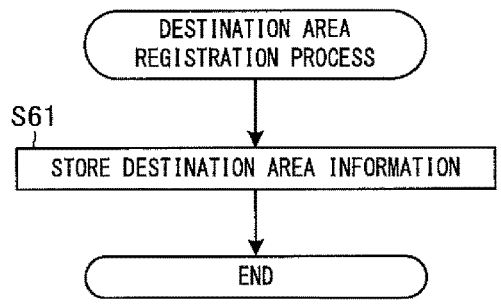
FIG. 18B is a flowchart showing an example of a destination area registration process in the domestic online marketplace server 1 according to an embodiment.
Figure 19:
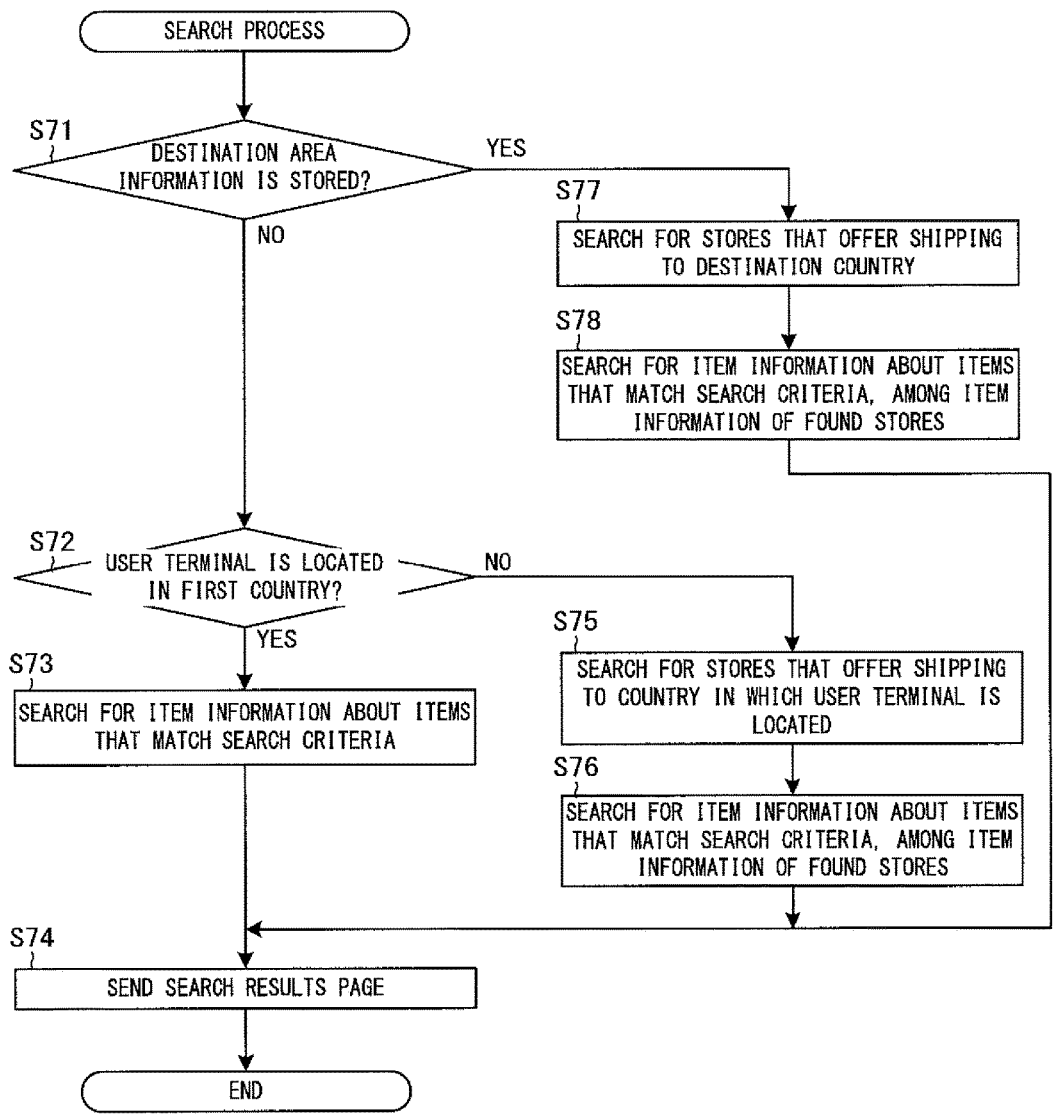
FIG. 19 is a flowchart showing an example of a search process in the domestic online marketplace server 1 according to an embodiment.

The following describes how the information processing system S works, with reference to FIGS. 17 to 19.

FIG. 17 is a flowchart showing an example main process in the system controller 14 of the domestic online marketplace server 1 according to this embodiment. In FIG. 17, the same steps as in FIG. 12 are denoted by the same reference signs. As shown in FIG. 17, the system controller 14 performs Steps S1 to S9. If the determination result is "shipping available" in Step S9, the system controller 14 performs Step S14. If the determination result is not "shipping available" in Step S9, the system controller 14 performs Steps S10 and S11. After Step S11, the substitute information provider 146 identifies the number of impressions corresponding to the user ID included in the order placing request, in the member DB 12a. The substitute information provider 146 adds 1 to the identified number of impressions (Step S50). Subsequently, the system controller 14 performs Step S13 or S6, based on the determination in Step 12.

FIG. 18A is a flowchart showing an example of a home page sending process in the system controller 14 of the domestic online marketplace server 1 according to this embodiment. When a home page request is received from the user terminal 4, the system controller 14 performs the home page sending process.

As shown in FIG. 18A, the information provider 14*a* retrieves the number of impressions corresponding to a user ID included in the received request (Step S51). Subsequently, the information provider 14*a* determines whether the number of impressions is greater than or equal to the set number stored in the storage unit 12 (Step S52). If the information provider 14*a* determines that the number of impressions is not greater than or equal to the set number (NO in Step S52), the home page sending process proceeds to Step S53. In Step S53, the information provider 14*a* sends a home page not including the country specification link group 630 to the user terminal 4 and then terminates the home page sending process. On the other hand, if the information provider 14*a* determines that the number of impressions is greater than or equal to the set number (YES in Step S52), the home page sending process proceeds to Step S54. In Step S54, the information provider 14*a* sends a home page including the country specification link group 630 to the user terminal 4 and then terminates the home page sending process.

FIG. 18B is a flowchart showing an example of a destination area registration process in the domestic online marketplace server 1 according to this embodiment. When a destination area registration request is received from the user terminal 4, the system controller 14 performs the destination area registration process. As shown in FIG. 18B, the destination obtainer 143 stores the destination area information included in the destination area registration request in association with the user ID included in the destination area registration request in the member DB 12*a* (Step S61) and terminates the destination area registration process.

FIG. 19 is a flowchart showing an example of a search process in the domestic online marketplace server 1 according to this embodiment. On the web page for searching for items, the user specifies search criteria and performs an operation for requesting a search. The user terminal 4 then sends a search request to the domestic online marketplace server 1. The search request includes the user ID and search criteria. When the search request is received, the system controller 14 performs the search process.

As shown in FIG. 19, the information provider 14*a* determines whether the destination area information corresponding to the user ID included in the search request is stored in the member DB 12*a* (Step S71). If the information provider 14*a* determines that the destination area information is not stored (NO in Step S71), the search process proceeds to Step S72. On the other hand, if the information provider 14*a* determines that the destination area information is stored (YES in Step S71), the search process proceeds to Step S77.

In Step S72, the information provider 14*a* determines whether the user terminal 4 that has sent the search request is located in the first country. For example, the information provider 14*a* retrieves the country number corresponding to the IP address of the user terminal 4 from the IP address/country table. The information provider 14*a* then determines whether the retrieved country number is the country number of the first country. If the retrieved country number is the country number of the first country, the information provider 14*a* determines that the user terminal 4 is located in the first country (YES in Step S72). In this case, the information provider 14*a* causes the search process to proceed to Step S73. On the other hand, if the retrieved country number is not the country number of the first country, the information provider 14*a* determines that the user terminal 4 is not located in the first country (NO in Step S72). In this case, the information provider 14*a* causes the search process to proceed to Step S75.

In Step S73, the information provider 14*a* searches the item DB 12*e* for item information about items that match the search criteria, and the search process proceeds to Step S74. In Step S74, the information provider 14*a* generates a search results page, based on the retrieved item information. The information provider 14*a* then sends the search results page to the user terminal 4 and terminates the search process.

In Step S75, the information provider 14*a* searches for stores that offer shipping to the country in which the user terminal 4 is located, among the stores in the domestic online marketplace. How to search in this step may be the same as that in Step S32 of the substitute item search process shown in FIG. 14A. Subsequently, the information provider 14*a* searches for item information about items that match search criteria, among items that are sold by the stores that offer shipping to the country in which the user terminal 4 is located (Step S76), and performs Step S74.

In Step S77, the information provider 14*a* searches for stores that offer shipping to a country indicated by the destination area information, among the stores in the domestic online marketplace. How to search in this step may be the same as that in Step S32 of the substitute item search process shown in FIG. 14A. Subsequently, the information provider 14*a* searches for item information about items that match the search criteria, among items that are sold by the stores that offer shipping to the country indicated by the destination area information is located (Step S78), and performs Step S74.

As described above, according to this embodiment, when substitute information has been displayed for a user a predetermined number of times or more, the system controller 14 causes an operation element for specifying a destination area to be displayed on a predetermined web page for allowing selection of items, among the web pages of the domestic online marketplace. The system controller 14 obtains a destination area specified based on an operation on the displayed operation element. The system controller 14 provides a user with information about at least one item that can be shipped to the specified destination area. This can prevent the user from selecting an item that cannot be shipped to the specified area.

3. Third Embodiment 3-1. Configuration of Domestic Online Marketplace Server

Figure 20:
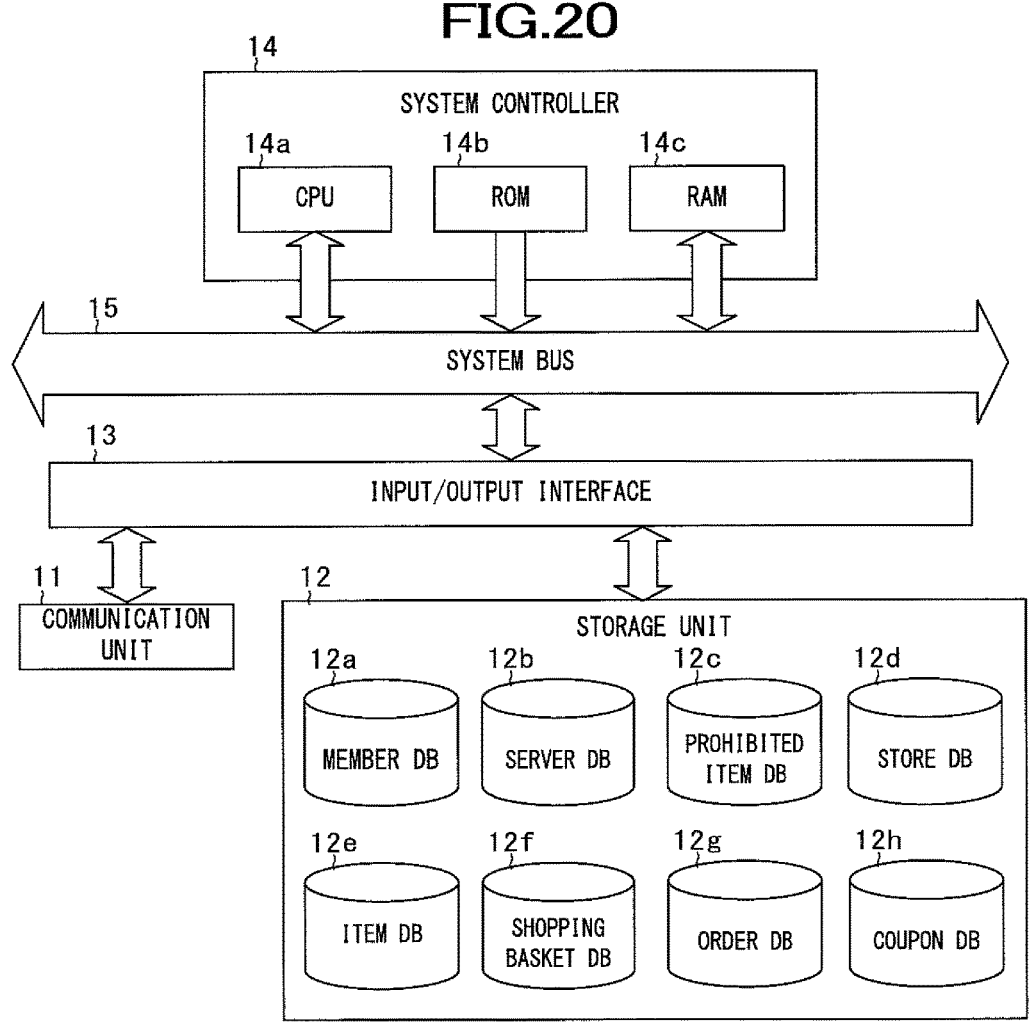
FIG. 20 is a block diagram schematically showing an example configuration of the domestic online marketplace server 1 according to an embodiment.

The following describes a third embodiment. Except for points described below, the third embodiment is the same as the first or second embodiment. FIG. 20 is a block diagram schematically showing an example configuration of the domestic online marketplace server 1 according to this embodiment. In FIG. 20, the same components as in FIG. 2 are denoted by the same reference signs. As shown in FIG. 20, the storage unit 12 of the domestic online marketplace server 1 stores a coupon DB 12*h* as well as the member DB 12*a* to the order DB 12*g*. Otherwise, the domestic online marketplace server 1 has the same configuration as shown in FIG. 2.

Figure 21:
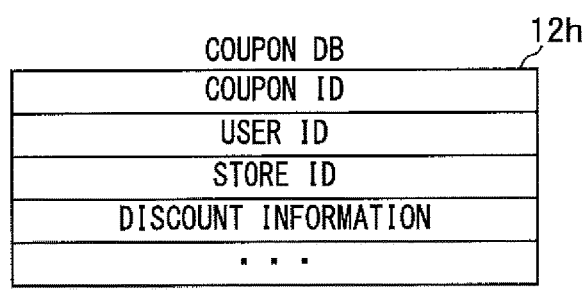
FIG. 21 is a diagram showing example entries in a coupon DB 12h.

FIG. 21 is a diagram showing example entries in the coupon DB 12*h*. The coupon DB 12*h* stores coupon information about coupons given to users. Each user can use the coupons given to his or her in the domestic online marketplace. Specifically, the user can purchase items at a discount using a coupon. The coupon DB 12*h* stores, for each coupon, a coupon ID, a user ID, a store ID, discount information, and other information in association with each other, as coupon information. The coupon ID is the identification information of the coupon. The user indicates a user to whom the coupon is given. The store ID indicates a store where the coupon can be used. The user identified by the user ID can use the coupon to purchase items that are sold by the store identified by the store ID. The discount information indicates how much the price of items is reduced. For example, the discount information may be indicate an amount to be subtracted from the price or may indicate a discount rate.

3-2. Functional Overview of System Controller

The following describes a functional overview of the system controller 14. When a substitute item is ordered and the order total for the substitute item is paid, the order processor 147 determines to give a coupon that can be used to purchase items being sold by a seller of an initially selected item to the orderer of the substitute item. The user who has ordered the substitute item is a user of the domestic online marketplace. Thus, the user is likely to specify the first country when ordering items in the future. At that time, the user is likely to purchase items at the store with which he or she placed an order before. A coupon given to such a user can increase the probability that items will be ordered. The substitute item ordered causes the store that sells the initially selected item to lose the chance of selling the item. Use of the coupon can compensate the store for the loss on its sales. For example, when determining to give a coupon, the order processor 147 may send an email to notify the user who ordered the substitute item that a coupon has been given to the user.

3-3. How Information Processing System Works

Figure 22:
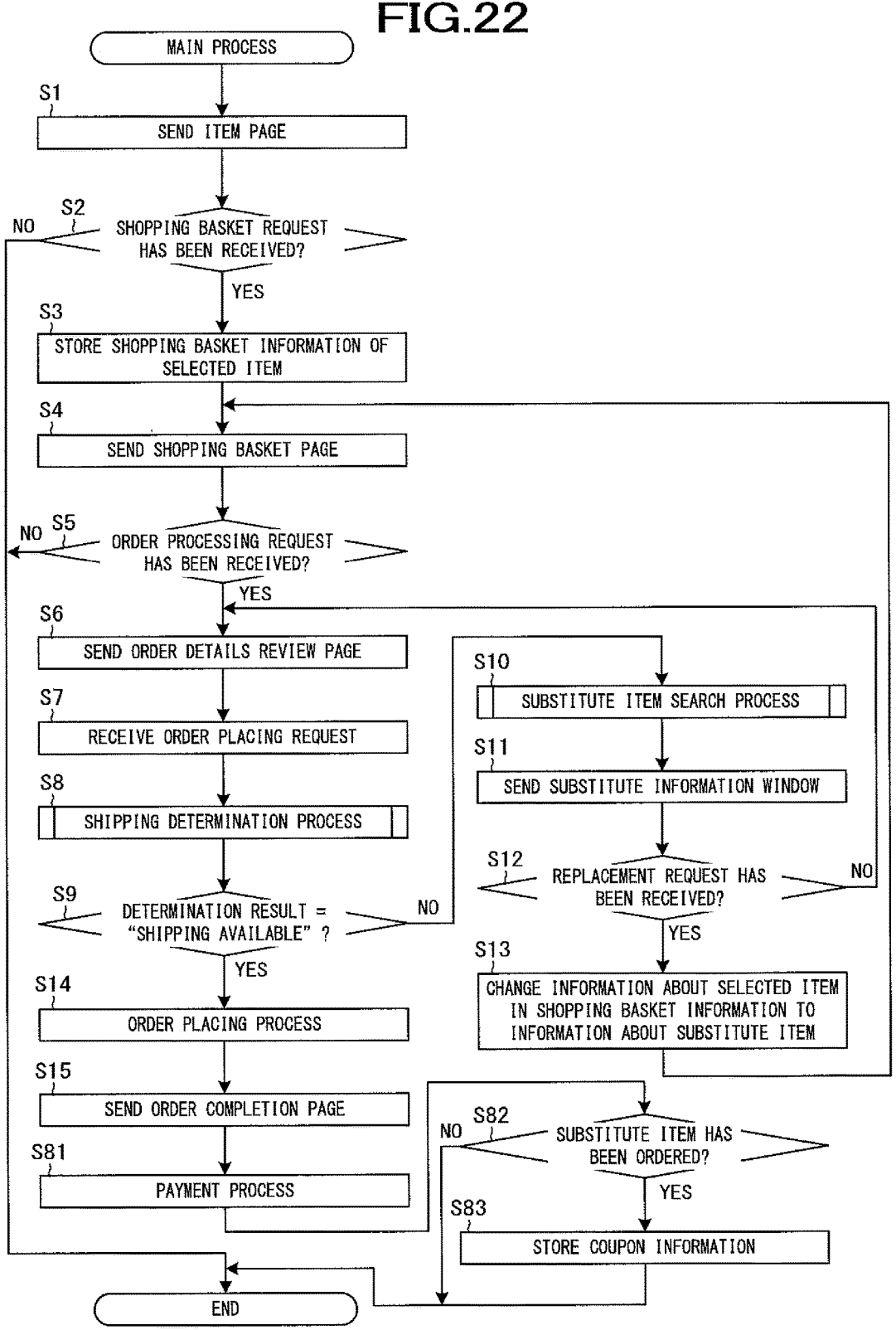
FIG. 22 is a flowchart showing an example main process in the system controller 14 of the domestic online marketplace server 1 according to an embodiment.

The following describes an operation of the information processing system S with reference to FIG. 22.

FIG. 22 is a flowchart showing an example main process in the system controller 14 of the domestic online marketplace server 1 according to this embodiment. In FIG. 22, the same steps as in FIG. 12 are denoted by the same reference signs. As shown in FIG. 22, the system controller 14 performs Steps S1 to S15. When sending the order details review page in Step S6, the item selection receiver 142 generates the order details review page so that a coupon can be selected as a method of payment of the order total if the coupon DB 12h stores coupon information including the combination of the user ID and the store ID that are included in the order processing request. When storing the order information in Step S14, the order processor 147 determines whether a coupon is selected. If a coupon is selected, the order processor 147 reduce the order total, based on discount information included in the corresponding coupon information.

After S15, the order processor 147 performs a payment process for the order total (Step S81). For example, when a credit card is selected as the payment method, the order processor 147 requests the corresponding company's server device to process payment of the order total. If the payment of the order total is successfully processed, the order processor 147 determines whether a substitute item has been ordered (Step S82). For example, if the substitute flag included in the stored order information is FALSE, the order processor 147 determines that no substitute item has been ordered (NO in Step S82) and terminates the main process. For example, if the substitute flag is TRUE, the order processor 147 determines that a substitute item has been ordered (YES in Step S82) and terminates the main process.

In Step S83, the order processor 147 determines to give a coupon and then stores coupon information in the coupon DB 12h. For example, the order processor 147 obtains the store ID from the pre-change item information included in the stored order information. The order processor 147 also obtains the user ID from the order information. The order processor 147 determines discount information. For example, the order processor 147 may retrieve discount information preset by the administrator of the domestic online marketplace from the storage unit 12. Also for example, the order processor 147 may multiply a total price obtained by subtracting a shipping fee from the order total and a predetermined coefficient to calculate a discount amount. The order processor 147 may determine this amount to be discount information. The order processor 147 stores coupon information including the obtained user ID, the obtained store ID, and the determined discount information, and then terminates the main process. When the payment method is a bank transfer, the store that sells the substitute item confirms that the order total has been transferred and then causes the store terminal 3 to notify the domestic online marketplace server 1 that payment of the order total has been completed. When this notification is received, the order processor 147 stores the coupon information.

As described above, according to this embodiment, when a substitute item is ordered and the order total is paid, the system controller 14 determines to give a coupon that can be used to purchase items being sold by a seller of a selected item to the orderer of the substitute item. Consequently, this can give the store that sells the replaced item a chance to sell items.

4. Fourth Embodiment 4-1. Functional Overview of System Controller

The following describes a fourth embodiment. Except for points described below, the fourth embodiment is the same as the first to third embodiments. In this embodiment, when the proportion of the actual sales of substitutes for items of a store in the domestic online marketplace to the store's actual sales is greater than or equal to a set percentage, the information provider 14a outputs recommendation information recommending to the store that the store offer shipping outside the area to which the store currently offers shipping.

A substitute item ordered causes the store that sells an initially selected item to lose the chance of selling the item. If the store offered international shipping and that caused a rather large increase in its sales performance, the store might think it acceptable to offer international shipping. For example, even though it may take some effort to offer international shipping, the store might think it acceptable to offer international shipping if its sales are expected to increase. Viewing the recommendation information, the store is prompted to offer international shipping. The information provider 14a uses the actual sales of substitute items to estimate an increase in sales. The set percentage may be preset, for example, by the administrator of the domestic online marketplace. The recommendation information may be, for example, an email. Alternatively, for example, the recommendation information may be displayed on a web page sent from the domestic online marketplace server 1 to the store terminal 3. FIG. 23 is a diagram showing an example of the body of an international shipping recommendation mail. The international shipping recommendation mail is an email containing a message recommending offering international shipping. In addition to this, the body of the international shipping recommendation mail may contain, for example, the URL of a web page for choosing whether to offer international shipping.

4-2. How Information Processing System Works

Figure 24:
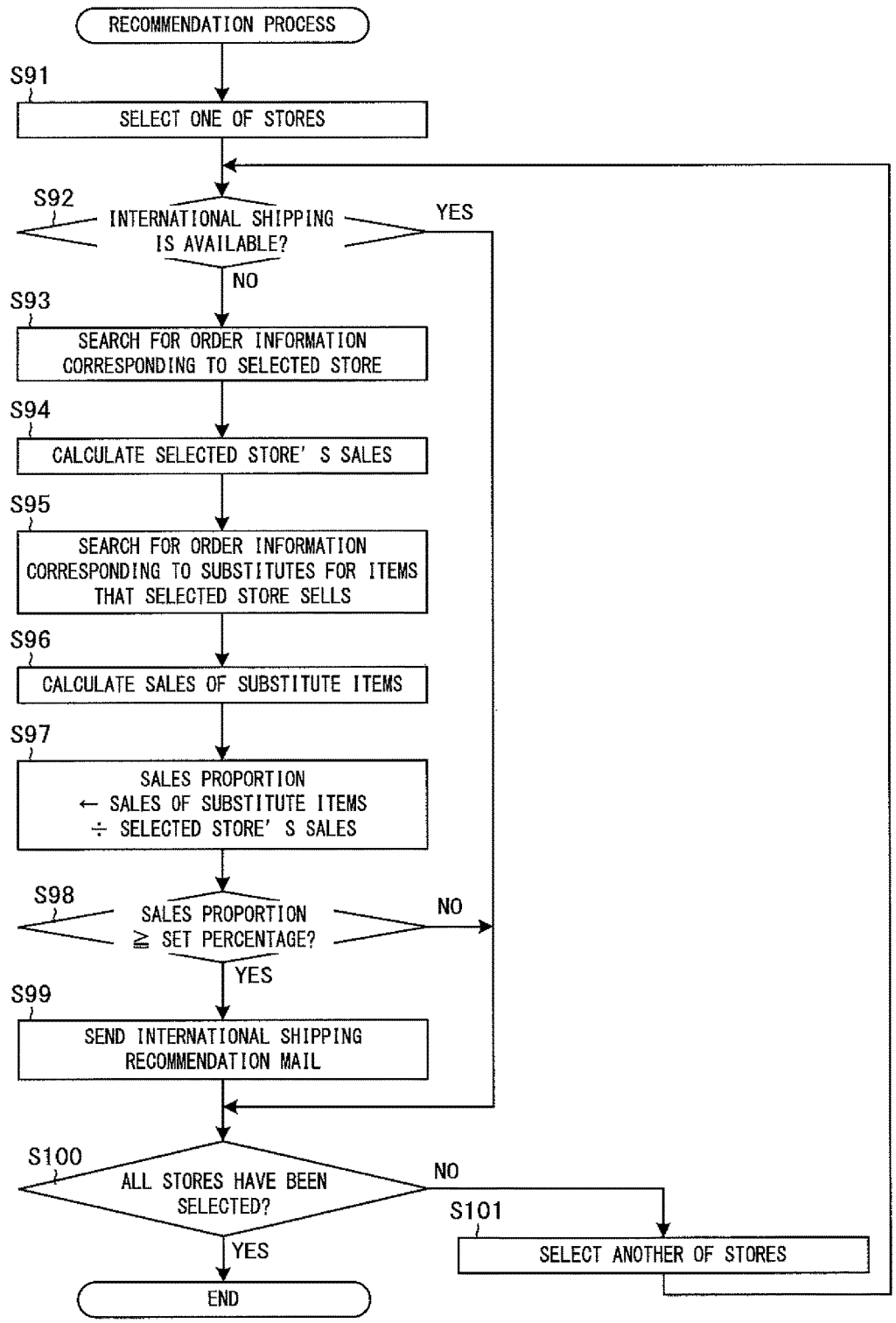
FIG. 24 is a flowchart showing an example of a recommendation process in the system controller 14 of the domestic online marketplace server 1 according to an embodiment.

The following describes an operation of the information processing system S with reference to FIG. 24. FIG. 24 is a flowchart showing an example of a recommendation process in the system controller 14 of the domestic online marketplace server 1 according to this embodiment. For example, the system controller 14 may perform the recommendation process at predetermined intervals, such as at intervals of one week, one month, several months, or one year.

As shown in FIG. 24, the information provider 14a selects one of the stores in the domestic online marketplace (Step S91). Subsequently, the information provider 14a retrieves the delivery area information corresponding to the store ID of the selected store from the store DB 12d. Based on the delivery area information, the information provider 14a determines whether the selected store offers shipping abroad from the first country (Step S92). In this embodiment, the delivery area information may be, for example, an international shipping flag. If the international shipping flag is TRUE, the information provider 14a determines that the store offers international shipping (YES in Step S92) and the recommendation process proceeds to Step S100. On the other hand, if the international shipping flag is FALSE, the information provider 14a determines that the store does not offer international shipping (NO in Step S92) and the recommendation process proceeds to Step S93.

In Step S93, the information provider 14a searches the order DB 12g for order information that includes an order date and time that is within the past predetermined period of time, among the pieces of order information corresponding to the store ID of the selected store. The information provider 14a then adds up total amounts included in the retrieved pieces of order information to calculate the selected store's sales (Step S94).

Subsequently, the information provider 14a searches the order DB 12g for order information corresponding to substitutes for items that the selected store sells (Step S95). For example, the information provider 14a searches for order information in which the store ID of the pre-change item information is identical to the store ID of the selected store, among the pieces of order information that includes a substitute flag of TRUE. Next, the information provider 14a adds up total amounts included in the retrieved pieces of order information to calculate the sales of the substitute items (Step S96).

After that, the information provider 14a divides the sales of the substitute items by the selected store's sales to calculate a sales proportion (Step S97). The information provider 14a then determines whether the sales proportion is greater than or equal to the set percentage prestored in the storage unit 12 (Step S98). If the information provider 14a determines that the sales proportion is not greater than or equal to the set percentage (NO in Step S98), the recommendation process proceeds to Step S100. On the other hand, if the information provider 14a determines that the sales proportion is greater than or equal to the set percentage (YES in Step S98), the recommendation process proceeds to Step S99.

In Step S99, the information provider 14a sends an international shipping recommendation mail to the selected store. The information provider 14a then determines whether all the stores in the domestic online marketplace have been selected (Step S100). If the information provider 14a determines that at least one of the stores remains to be selected (NO in Step S100), the recommendation process proceeds to Step S101. In Step S101, the information provider 14a selects one of the remaining stores, and the recommendation process proceeds to Step S92. On the other hand, if it determines that all the user IDs have been selected (YES in Step S100), the information provider 14a terminates the recommendation process.

As described above, according to this embodiment, the storage unit 12 stores, for each of a plurality of stores that sell a plurality of items, delivery area information that can identify which area the store offers shipping to. The system controller 14 retrieves the delivery area information of the store that sells the selected item from the storage unit 12. If the specified destination is outside the area identified by the retrieved delivery area information, the system controller 14 causes substitute information to be displayed. When the proportion of the actual sales of substitutes for items of a target store, among the plurality of stores, to the target store's actual sales is greater than or equal to a predetermined percentage, the system controller 14 outputs recommendation information recommending to the target store that the target store offer shipping outside the area indicated by the delivery area information of the target store. Consequently, this can prompt the target store to offer item shipping to an area to which it has not offered shipping.

5. Fifth Embodiment

5-1. Functional Overview of System Controller

The following describes a fifth embodiment. Except for points described below, the fifth embodiment is the same as the first to fourth embodiments. In this embodiment, the substitute item searcher 145 obtains an IP address assigned to the store terminal 3, from a packet sent from a store terminal 3 to the domestic online marketplace server 1. The substitute item searcher 145 stores the obtained IP address in association with the store ID of a store that uses the store terminal 3 that has connected to the domestic online marketplace server 1, in the store DB 12d. The area in which each store terminal 3 is located is identified based on its stored IP address. The substitute item searcher 145 searches for an item that is sold by a store whose store terminal 3 is located an area that includes the specified destination, among the stores in the domestic online marketplace, as a substitute item. The substitute information provider 146 then causes the user terminal 4 to display substitute information about a substitute item found by the search. It is likely that the place in which a store terminal 3 used by a store is located is a ship-from place for items of the store. It is more convenient to ship an item from a point in the area including its destination to the destination than to ship the item from the first country to the destination. For example, the shipping fee becomes lower and the shipping time becomes shorter. The substitute item searcher 145 estimates the ship-from place for an item, based on the IP address of the store terminal 3, and determines a store that is likely to have a ship-from place in the area including the destination to be a store that sells a substitute for the item. This can make it more convenient to ship a substitute item.

5-2. How Information Processing System Works

The following describes how the information processing system S works, with reference to FIGS. 25A and 25B. FIG. 25A is a flowchart showing an example of a store login process in the system controller 14 of the domestic online marketplace server 1 according to this embodiment. When a store employee enters a store ID and a password to log in to the domestic online marketplace, the store terminal 3 sends a login request to the domestic online marketplace server 1. The login request includes the entered store ID and password. When the login request is received from the store terminal 3, the system controller 14 performs the store login process.

As shown in FIG. 25A, the system controller 14 perform an authentication process, based on the store ID and the password that are included in the login request (Step S111). Subsequently, the substitute item searcher 145 obtains a source IP address from the packet header of the login request (Step S112). The subsequently then stores the obtained source IP address in association with the store ID included in the login request (Step S113) and terminates the store login process.

FIG. 25B is a flowchart showing an example of the substitute item search process in the system controller 14 of the domestic online marketplace server 1 according to this embodiment. In FIG. 25B, the same steps as in FIG. 14A are denoted by the same reference signs. As shown in FIG. 25B, if the selected item is a prohibited item (YES in Step S31), the system controller 14 performs Steps S34 and S35. If the selected item is not a prohibited item (NO in Step S31), the substitute item searcher 145 searches for stores that offer shipping to the destination area, among the stores in the domestic online marketplace (Step S32).

Subsequently, the substitute item searcher 145 searches for a store for which an area that is identified based on an IP address assigned to its store terminal 3 includes the specified destination, among stores found in Step S32 (Step S121). For example, the substitute item searcher 145 retrieves the IP addresses corresponding to the store IDs of the found stores from the store DB 12d. The substitute item searcher 145 retrieves the country numbers corresponding to the retrieved IP addresses from the IP address/country table. The substitute item searcher 145 then determines whether each of the retrieved country numbers is identical to the country number of the destination country, to make the search.

After that, the substitute item searcher 145 searches for a substitute item, among items that are sold by the store found in Step S121 (Step S33) and terminates the substitute item search process.

As described above, according to this embodiment, the system controller 14 obtains a network address of a store terminal 3 from a packet sent from the store terminal 3 to the domestic online marketplace server 1 over the network NW. The area in which each store terminal 3 is located is identified based on its network address. The system controller 14 causes substitute information to be displayed. The substitute information can identify an item being sold by a store that uses a store terminal 3 located in an area including a specified destination, among a plurality of stores. Consequently, a substitute item is likely to be shipped from a ship-from place in the area to its destination in the area. This can make it more convenient to ship the substitute item.

6. Sixth Embodiment 6-1. Configuration of Domestic Online Marketplace Server

The following describes a sixth embodiment. Except for points described below, the sixth embodiment is the same as the first to fifth embodiments. FIG. 26 is a block diagram schematically showing an example configuration of the domestic online marketplace server 1 according to this embodiment. In FIG. 26, the same components as in FIG. 2 are denoted by the same reference signs. As shown in FIG. 26, the storage unit 12 of the domestic online marketplace server 1 stores a shipping convenience DB 12i as well as the member DB 12a to the order DB 12g. Otherwise, the domestic online marketplace server 1 has the same configuration as shown in FIG. 2.

FIG. 27A is a diagram showing an example of information stored in the shipping convenience DB 12i. The shipping convenience DB 12i stores shipping convenience indicating how convenient items are shipped from a plurality of countries covered by each of a plurality of online marketplace servers, including the domestic online marketplace server 1 and the foreign online marketplace servers 2, to a destination country. The shipping convenience may be, for example, how low shipping fees are, how short shipping times are, and how near it is from a ship-from country to a destination country. The shipping convenience DB 12i stores a plurality of combinations, each combination including a ship-from country number and a convenience value, in association with a destination country number, as shipping convenience information. The destination country number is a number indicating a destination country. Each ship-from country number is a number indicating a ship-from country. The ship-from country is a countries covered by an online marketplace server. Each convenience value is a value indicating shipping convenience. The convenience value may be, for example, a shipping fee, a shipping time, or a distance. Alternatively, for example, the convenience value may be the rank of each of a plurality of ship-from countries ranked in descending order of convenience.

FIGS. 27B and 27C are each a diagram showing an example shipping convenience ranking of a plurality of countries. FIG. 27B shows an example where the destination country is the United Kingdom. As shown in FIG. 27B, the United Kingdom, France, Germany, Austria, the United States, China, and Japan are ranked in descending order of convenience. FIG. 27C shows an example where the destination country is China. As shown in FIG. 27C, China, Japan, Austria, Germany, France, the United Kingdom, and the United States are ranked in descending order of convenience.

6-2. Functional Overview of System Controller

The following describes a functional overview of the system controller 14. In this embodiment, in an order based on how convenient items are shipped from each of a plurality of countries to a destination country, the substitute item searcher 145 causes online marketplace servers of these countries to search for substitute items one after another. An online marketplace server corresponding to a country with higher shipping convenience performs the search earlier in order. For example, when the destination country is the United Kingdom, searches for substitute items are made in the order of the United Kingdom, France, Germany, Austria, the United States, China, and Japan. If any substitute item is found, the substitute item searcher 145 may stop further searches at that moment.

The substitute information provider 146 causes substitute information to be displayed, based on the result of the search by an online marketplace server that has found a substitute item first among the plurality of online marketplace servers. This can make it more convenient to ship a substitute item ordered. In addition, an item convenient for a user can be found faster.

The substitute item searcher 145 may cause these online marketplace servers to search for substitute items one after another, for example, until a predetermined number of substitute items are found. In this case, the substitute information provider 146 may cause substitute information for identifying the predetermined number of substitute items to be displayed. For example, one of the online marketplace servers may find the predetermined number of substitute items. Alternatively, the total number of substitute items found by some of the online marketplace servers may be the predetermined number. Also in this case, items convenient for a user can be found faster.

6-3. How Information Processing System Works

Next, an operation of the information processing system S will be described with reference to FIGS. 28 and 29.

Figure 28:
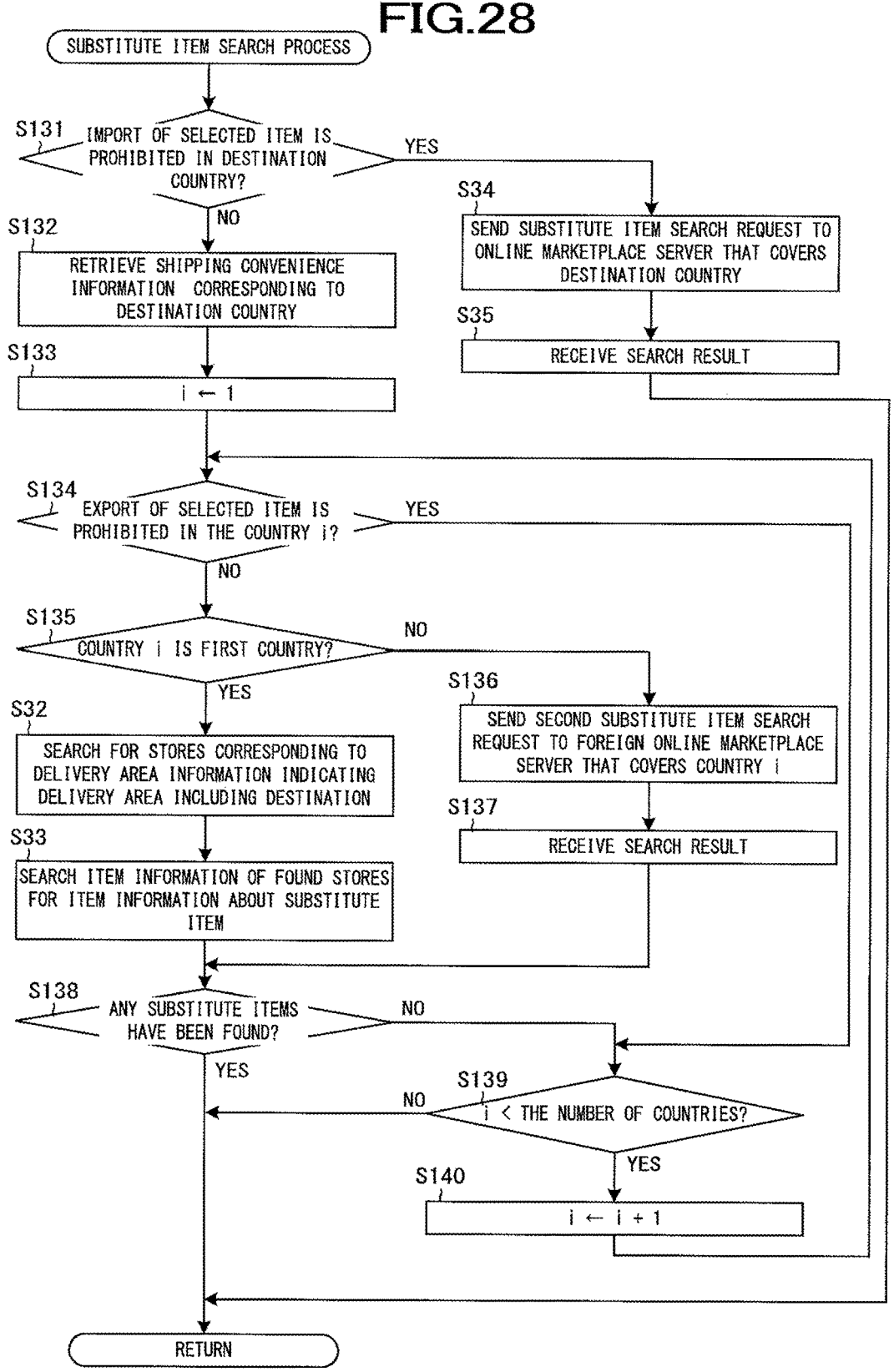
FIG. 28 is a flowchart showing an example of the substitute item search process in the system controller 14 of the domestic online marketplace server 1 according to an embodiment.

FIG. 28 is a flowchart showing an example of the substitute item search process in the system controller 14 of the domestic online marketplace server 1 according to this embodiment. In FIG. 28, the same steps as in FIG. 14A are denoted by the same reference signs. As shown in FIG. 28, the substitute item searcher 145 determines, based on the prohibited item DB 12c, whether import of the selected item is prohibited in the specified destination country (Step S131). If it determines that the import of the selected item is prohibited (YES in Step S131), the substitute item searcher 145 performs Steps S34 and S35, and then terminates the substitute item search process. On the other hand, if the substitute item searcher 145 determines that the import of the selected item is not prohibited (NO in Step S131), the substitute item search process proceeds to S132.

In Step S132, the substitute item searcher 145 retrieves the shipping convenience information corresponding to the country number of the destination country from the shipping convenience DB 12i. Subsequently, the substitute item searcher 145 sets a rank i to 1 (Step S133). The substitute item searcher 145 then obtains the ship-from country number associated with the i-th highest shipping convenience, based on the retrieved shipping convenience information. The country with the i-th highest shipping convenience is referred to as a country i. Next, the substitute item searcher 145 determines, based on the prohibited item DB 12c, whether export of the selected item from the country i is prohibited (Step S134). If the substitute item searcher 145 determines that the export of the selected item is prohibited (YES in Step S134), the substitute item search process proceeds to S139. On the other hand, if the substitute item searcher 145 determines that the export of the selected item is not prohibited (NO in Step S134), the substitute item search process proceeds to S135.

In Step S135, the substitute item searcher 145 determines whether the country i is the first country. If it determines that the country i is the first country (YES in Step S135), the substitute item searcher 145 performs Steps S32 and S33, and the substitute item search process proceeds to S138. On the other hand, if the substitute item searcher 145 determines that the country i is not the first country (NO in Step S135), the substitute item search process proceeds to S136. In Step S136, the substitute item searcher 145 sends a second substitute item search request to a foreign online marketplace server 2 that covers the country i.

Figure 29:
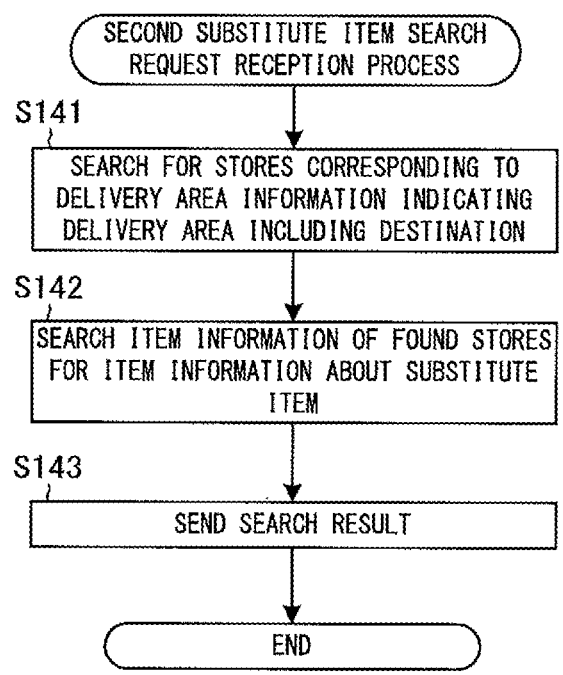
FIG. 29 is a flowchart showing an example of a second substitute item search request reception process in the system controller 24 of the foreign online marketplace server 2 according to an embodiment.

FIG. 29 is a flowchart showing an example of a second substitute item search request reception process in the system controller 24 of the foreign online marketplace server 2 according to this embodiment. When the second substitute item search request is received from the domestic online marketplace server 1, the system controller 24 performs the second substitute item search request reception process. As shown in FIG. 29, the system controller 24 searches the store DB 22a for stores that offer shipping to the destination area, among the stores in the domestic online marketplace of the country i (Step S141). How to search in this step may be the same as that in Step S32 shown in FIG. 28. Subsequently, the system controller 24 searches the item DB 22b for item information about a substitute item, among items that are sold by the stores that offer shipping to the destination area, based on search criteria included in the second substitute item search request (Step S142). How to search in this step may be the same as that in Step S33 shown in FIG. 28. Next, the system controller 24 sends a search result including item information found by the search to the domestic online marketplace server 1 (Step S143).

As shown in FIG. 28, the substitute item searcher 145 receives the search result sent from the foreign online marketplace server 2 (Step S137) and the substitute item search process proceeds to Step S138. In Step S138, the substitute item searcher 145 determines whether any substitute items have been found, based on the search result in Step S33 or the search result received in Step S137. If the substitute item searcher 145 determines that no substitute item has been found (NO in Step S138), the substitute item search process proceeds to S139. In Step S139, the substitute item searcher 145 determines whether the rank i is less than the number of countries covered by a plurality of domestic online marketplace servers. If the substitute item searcher 145 determines that the rank i is less than the number of countries covered by the plurality of domestic online marketplace servers (YES in Step S139), the substitute item search process proceeds to Step S140. In Step S140, the substitute item searcher 145 adds 1 to the rank i, and the substitute item search process proceeds to Step S134. On the other hand, if it determines that the rank i is not less than the number of countries covered by the plurality of domestic online marketplace servers cover (NO in Step S139), the substitute item searcher 145 terminates the substitute item search process.

In Step S138, if it determines that a substitute items has been found (YES in Step S138), the substitute item searcher 145 terminates the substitute item search process. As shown in FIG. 12, after the substitute item search process, the substitute information provider 146 causes the user terminal 4 to display the substitute information window, based on the search result (Step S11).

As described above, in an order based on shipping convenience from each of a plurality of areas to a specified destination, the system controller 14 causes a plurality of online marketplace servers to search for substitute items one after another. The system controller 14 causes substitute information to be displayed, based on the result of a search by an online marketplace server that has found a substitute item first among the plurality of online marketplace servers. Consequently, a substitute item is likely to be shipped from an area with higher shipping convenience to its destination. This can make it more convenient to ship the substitute item.

7. Seventh Embodiment

Figure 30:
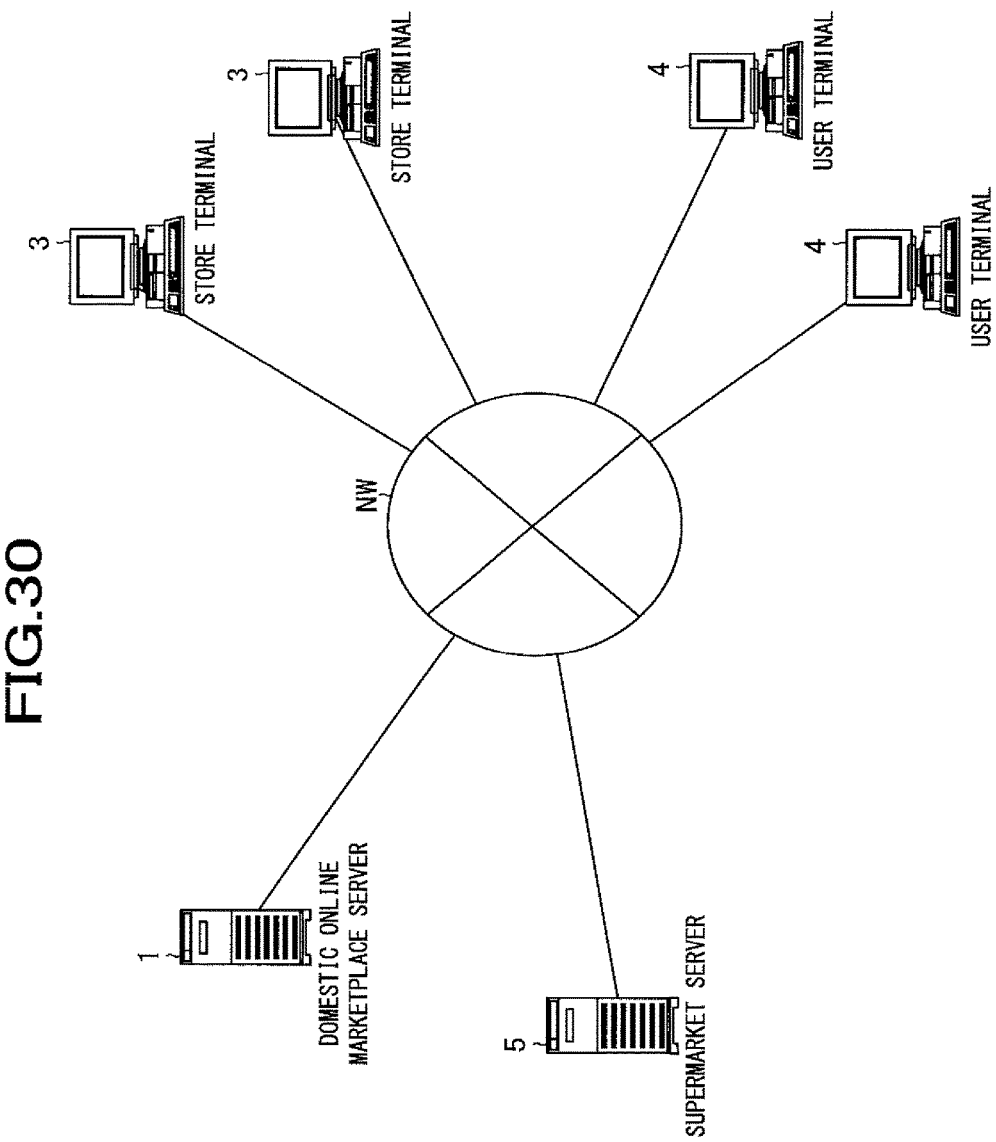
FIG. 30 is a diagram schematically showing an example configuration of an information processing system SS according to an embodiment.

The following describes a seventh embodiment. FIG. 30 is a diagram schematically showing an example configuration of an information processing system SS according to this embodiment. In FIG. 30, the same components as in FIG. 1 are denoted by the same reference signs. As shown in FIG. 30, the information processing system SS includes a supermarket server 5, the domestic online marketplace server 1, the plurality of store terminals 3, and the plurality of user terminals 4. The supermarket server 5 is capable of exchanging data with the domestic online marketplace server 1, each store terminal 3, and each user terminal 4 over the network NW using communication protocols, such as TCP/IP.

In this embodiment, the supermarket server 5 is an example of an information processing device according to present invention. The supermarket server 5 is a server device that performs various processes for an online supermarket (or a net super).

The online supermarket is, for example, a system in which a predetermined company receives an order from a user via the network NW and delivers an item ordered to the user's home at a date and time specified by the user. Items available for order in the online supermarket include perishables. The first country has one ship-from place for the items available for order in the online supermarket. Alternatively, the first country has several ship-from places for the items in its limited area. Thus, the items available for order in the online supermarket can be shipped to a limited area in the first country. This area is referred to as an "online supermarket delivery area". The supermarket server 5 sends web pages of the online supermarket and performs processes for item searches and orders, in response to requests from the user terminals 4.

The supermarket server 5 includes, for example, a system controller including a CPU, a ROM, and a RAM, a storage unit such as hard disk drives, a communication unit for connecting to the network NW. The storage unit of the supermarket server 5 stores an item DB, a shopping basket DB, an order DB, and other databases. The item DB stores item information about items that are sold in the online supermarket. The shopping basket DB stores shopping basket information about items in shopping baskets in the online supermarket. The order DB stores order information about orders for items in the online supermarket. For example, the item DB, the shopping basket DB, and the order DB may have essentially the same structure as the item DB 12e, the shopping basket DB 12f, and the order DB 12g, respectively. Information stored in these databases may not include store IDs.

For example, users who have signed up for the domestic online marketplace server 1 may be able to order items in the online supermarket. The users can select items to add the items to their shopping baskets in the online supermarket, even if they do not log in to the online supermarket. This means that a user who has not signed up for the online supermarket can add an item to his or her shopping basket in the online supermarket. When ordering the item added to his or her shopping basket, the user only needs to log in or sign up. After the user has logged in or has signed up, the supermarket server 5 may retrieve the user's address, which is stored in the member DB 12a, as the destination of the selected item from the domestic online marketplace server 1.

When the user's address is outside the online supermarket delivery area, the item added to his or her shopping basket in the online supermarket cannot be shipped to the user's home even if the user lives in the first country. For this reason, when the user's address is outside the online supermarket delivery area, the supermarket server 5 searches for substitutes for the selected item among items being sold in the domestic online marketplace. For example, the supermarket server 5 may require the domestic online marketplace server 1 to search for substitute items via the network NW. The supermarket server 5 causes the user terminal 4 to display substitute information indicating a substitute item found by the search. The items being sold in the domestic online marketplace can be basically shipped to any place in the first country. Thus, if the user stops ordering the initially selected item and then orders a substitute item, the substitute item can be shipped to his or her home outside the online supermarket delivery area. The supermarket server 5 may cause the substitute information to be displayed so that the substitute item can be selected. When the user selects the substitute item, the supermarket server 5 replaces the initially selected item in his or her shopping basket with the substitute item.

As described above, according to this embodiment, the supermarket server 5 receives selection of an item for order, among a plurality of items that are sold in the online supermarket. The supermarket server 5 obtains a user's address prespecified for the selected item. If the specified address is outside the online supermarket delivery area, the supermarket server 5 causes substitute information to be displayed. The substitute information can identify a substitute item that can be shipped to the specified address and that is being sold in the domestic online marketplace. Thus, even if the specified destination is outside the online supermarket delivery area, the user can prevent his or her effort spent in selecting the item from going to waste.

REFERENCE SIGNS LIST

1 domestic online marketplace server
2 foreign online marketplace server
3 store terminal
4 user terminal
5 supermarket server
11 communication unit
12 storage unit
12a member DB
12b server DB
12c prohibited item DB
12d store DB
12e item DB
12f shopping basket DB
12g order DB
12h coupon DB
12i shipping convenience DB
13 input/output interface
14 system controller
14a CPU
14b ROM
14c RAM
15 system bus
21 communication unit
22 storage unit
22a store DB
22b item DB
23 input/output interface
24 system controller
24a CPU
24b ROM
24c RAM
25 system bus
141 information provider
142 item selection receiver
143 destination obtainer
144 shipping determiner
145 substitute item searcher
146 substitute information provider
147 order processor
NW network
S, SS information processing system

The invention claimed is:
1. A computer architecture comprising:
at least one memory configured to store computer program code;
at least one processor configured to access and operate according to said computer program code, said computer program code including:

receiving code configured to cause at least one of said at least one processor to receive selection of an item for an, order, among a plurality of items;

obtaining code configured to cause at least one of said at least one processor to obtain a specified destination for the selected item;

determining code configured to cause at least one of said at least one processor to determine, after the specified destination is obtained and before the order of the selected item is confirmed, whether the specified destination is located in any one of at least one deliverable area to which the selected item can be shipped based on the specified destination, and deliverable area information indicating the at least one deliverable area; and display control code configured to cause at least one of said at least one processor to display substitute information on a display of a user terminal based on the determination whether the specified destination is located in any one of the at least one deliverable area, the substitute information indicating a substitute item that can be shipped to the specified destination.

2. The computer architecture according to claim 1, wherein the receiving code is configured to cause at least one of said at least one processor to identify the selected item, from a virtual shopping cart used to add items to during online shopping that allows the plurality of items to be ordered, the display control code is configured to cause at least one of said at least one processor to display the substitute information to be displayed for a user to select the substitute item, and the computer architecture further comprises replacing code configured to cause at least one of said at least one processor to replace the selected item in the virtual shopping cart with the substitute item, based on the substitute item being selected.

3. The computer architecture according to claim 1, further comprising:

element display control code configured to cause at least one of said at least one processor to cause an operation element for specifying a destination area to be displayed on a predetermined screen for allowing the selection of items, among online shopping screens that allow the plurality of items to be ordered, when the substitute information has been displayed for a user a predetermined number of times or more;

destination area obtaining code configured to cause at least one of said at least one processor to obtain the destination area specified based on the operation on the displayed operation element; and providing code configured to cause at least one of said at least one processor to provide the user with information about at least one item that can be shipped to the specified destination, among the plurality of items.

4. The computer architecture according to claim 1, further comprising;

determining code configured to cause at least one of said at least one processor to determine to give a coupon for purchasing items being sold by a seller of the selected item to a purchaser of the substitute item, when the substitute item is ordered and an order total for the substitute item is paid.

5. The computer architecture according to claim 1, further comprising:

area information retrieval code configured to cause at least one of said at least one processor to retrieve area information of a seller that sells the selected item, from a storage that stores, for each of a plurality of sellers that sell the plurality of items, area information that identifies an area in which the seller offers shipping, wherein if the specified destination is outside the area identified by the retrieved area information, the display control code causes at least one of said at least one processor to display the substitute information, and the computer architecture further comprises output code configured to cause at least one of said at least one processor to output recommendation information recommending to a target seller, among the plurality of sellers, that the target seller offer shipping outside the area indicated by the area information of the target seller, when a proportion of actual sales of substitutes for items of the target seller to the target seller's actual sales is greater than or equal to a predetermined percentage.

6. The computer architecture according to claim 1, further comprising:

address obtaining code configured to cause at least one of said at least one processor to obtain a network address of a terminal device from a packet sent from the terminal device to the computer architecture over a network, the terminal device being one of a plurality of terminal devices used by a plurality of sellers that sell the plurality of items, wherein the display control code is configured to cause at least one of said at least one processor to display the substitute information, and the substitute information identifying an item being sold by a seller that uses a terminal device located in an area including the specified destination, among the plurality of sellers.

7. The computer architecture according to claim 1, wherein the computer architecture is included in at least one of a plurality of server devices capable of connecting to each other via a network, the plurality of server devices correspond one-to-one to online shopping sites of a plurality of areas, each of the plurality of server devices comprises:

a database of items that can be shipped to any one of at least one deliverable covered by the server device among the plurality of areas; and search code configured to cause at least one of said at least one processor to search the database for the items, the computer architecture further comprises search control code configured to cause at least one of said at least one processor to cause the plurality of server devices to search for the substitute item, in the order based on shipping convenience of each of the plurality of areas to the specified destination, and the display control code is configured to cause at least one of said at least one processor to display the substitute information, based on a result of a search by the one of the plurality of server devices that has found the substitute item first.

8. An information processing method performed by a computer, the method comprising:

receiving selection of an item for order, among a plurality of items;

obtaining a specified destination for the selected item;

determining, after the specified destination is obtained and before the order of the selected item is confirmed, whether the specified destination is located in any one of at least one deliverable area to which the selected item can be shipped based on the specified destination, and deliverable area information indicating the at least one deliverable area; and displaying substitute information on a display of a user terminal based on the determination whether the specified destination is located in any one of the at least one deliverable area, the substitute information indicating a substitute item that can be shipped to the specified destination.

9. A non-transitory computer readable medium storing thereon an information processing program, the information processing program causing a computer to:
receive selection of an item for order, among a plurality of items;
obtain a specified destination for the selected item;
determine, after the specified destination is obtained and before the order of the selected item is confirmed, whether the specified destination is located in any one of at least one deliverable area to which the selected item can be shipped based on the specified destination, and deliverable area information indicating the at least one deliverable area; and display substitute information on a display of a user terminal based on the determination whether the specified destination is located in any one of the at least one deliverable area, the substitute information indicating a substitute item that can be shipped to the specified destination.

10. The computer architecture according to claim 1, wherein the determining code is configured to cause at least one of said at least one processor to determine whether the selected item is a prohibited item an area of the specified destination.

* * * * *